United States Patent
Zanderléhn et al.

(10) Patent No.: US 8,702,108 B2
(45) Date of Patent: Apr. 22, 2014

(54) VEHICLE HAVING A LEVEL COMPENSATION SYSTEM

(75) Inventors: Karri Zanderléhn, Västerås (SE); Mikael Löfstrand, Västerås (SE)

(73) Assignee: Zoomability AB, Västerås (SE)

( * ) Notice: Subject to any disclaimer, the term of this patent is extended or adjusted under 35 U.S.C. 154(b) by 0 days.

(21) Appl. No.: 13/579,466

(22) PCT Filed: Feb. 17, 2011

(86) PCT No.: PCT/EP2011/052370
§ 371 (c)(1),
(2), (4) Date: Aug. 16, 2012

(87) PCT Pub. No.: WO2011/101422
PCT Pub. Date: Aug. 25, 2011

(65) Prior Publication Data
US 2012/0313335 A1 Dec. 13, 2012

Related U.S. Application Data

(60) Provisional application No. 61/306,968, filed on Feb. 23, 2010.

(51) Int. Cl.
*A61G 5/06* (2006.01)
*B62D 57/02* (2006.01)

(52) U.S. Cl.
USPC ......... 280/5.28; 180/8.2; 180/24.02; 180/209

(58) Field of Classification Search
USPC ............... 280/5.2, 5.24, 5.26, 5.28, 5.3, 5.32, 280/DIG. 10, 677; 180/8.2, 8.3, 21, 309, 180/901, 209, 24.02
See application file for complete search history.

(56) References Cited

U.S. PATENT DOCUMENTS

| | | | | |
|---|---|---|---|---|
| 1,149,153 A | * | 8/1915 | Schleicher | 180/23 |
| 1,551,127 A | * | 8/1925 | Whyel | 280/47.17 |
| 2,194,323 A | * | 3/1940 | Peterman | 280/81.1 |
| 3,109,506 A | * | 11/1963 | Schroter et al. | 180/8.1 |
| 3,345,104 A | * | 10/1967 | Ulicki | 296/24.31 |

(Continued)

FOREIGN PATENT DOCUMENTS

| | | |
|---|---|---|
| CA | 2227955 A1 | 6/1999 |
| JP | 5-97075 * | 4/1993 |

(Continued)

*Primary Examiner* — Anne Marie M Boehler
(74) *Attorney, Agent, or Firm* — Larson & Larson, P.A.; Frank Liebenow; Justin P. Miller

(57) ABSTRACT

A vehicle having a multiple of level compensation systems is disclosed. The vehicle comprising a chassis having a left frame, a right frame and a base plate, a first level compensation system comprising a pivot joint for pivotably connecting the left and right frames to the base plate around a common rotational axis. A first axial distance from a left rotation axis of a left wheel pair to the rotational axis is different from at least one second axial distance from a right rotation axis of a right wheel pair to the rotational axis, such that the left and right wheel pair have at least one off-set to each other. Moreover a method for traversing stairs with such vehicle is disclosed.

40 Claims, 23 Drawing Sheets

(56) References Cited

U.S. PATENT DOCUMENTS

| | | | |
|---|---|---|---|
| 3,893,533 A | 7/1975 | Tidwell | |
| 5,562,172 A * | 10/1996 | Mick | 180/24.02 |
| 5,791,425 A | 8/1998 | Kamen et al. | |
| 5,975,225 A | 11/1999 | Kamen et al. | |
| 6,428,026 B1 * | 8/2002 | Smith | 280/124.125 |
| 7,631,380 B1 | 12/2009 | Larson | |
| 2004/0129491 A1 | 7/2004 | Bean | |
| 2004/0232643 A1 | 11/2004 | Rosenquist | |

FOREIGN PATENT DOCUMENTS

| | | |
|---|---|---|
| RU | 1833182 A3 | 7/1993 |
| WO | 03018335 A1 | 6/2003 |
| WO | 2004062991 A1 | 7/2004 |

* cited by examiner

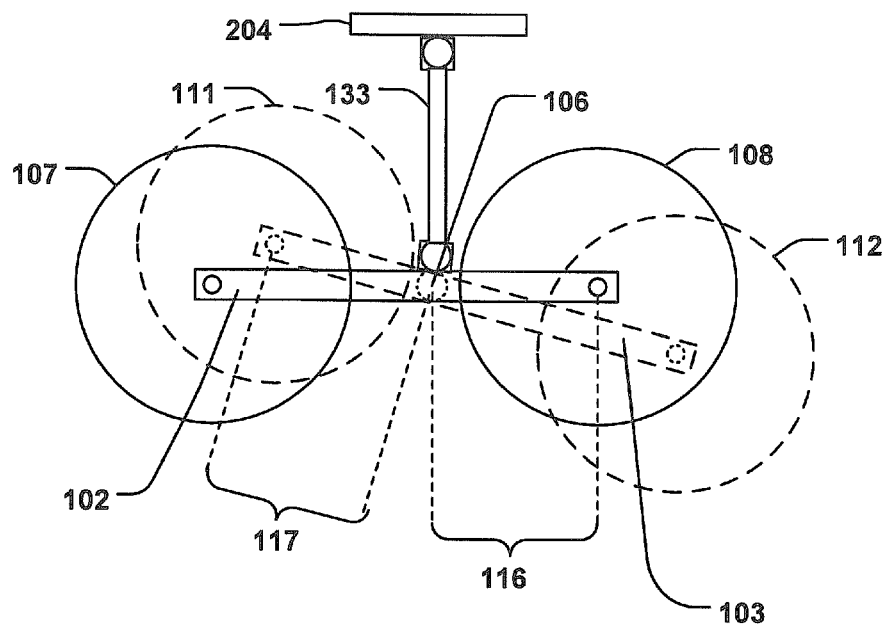
Fig. 2
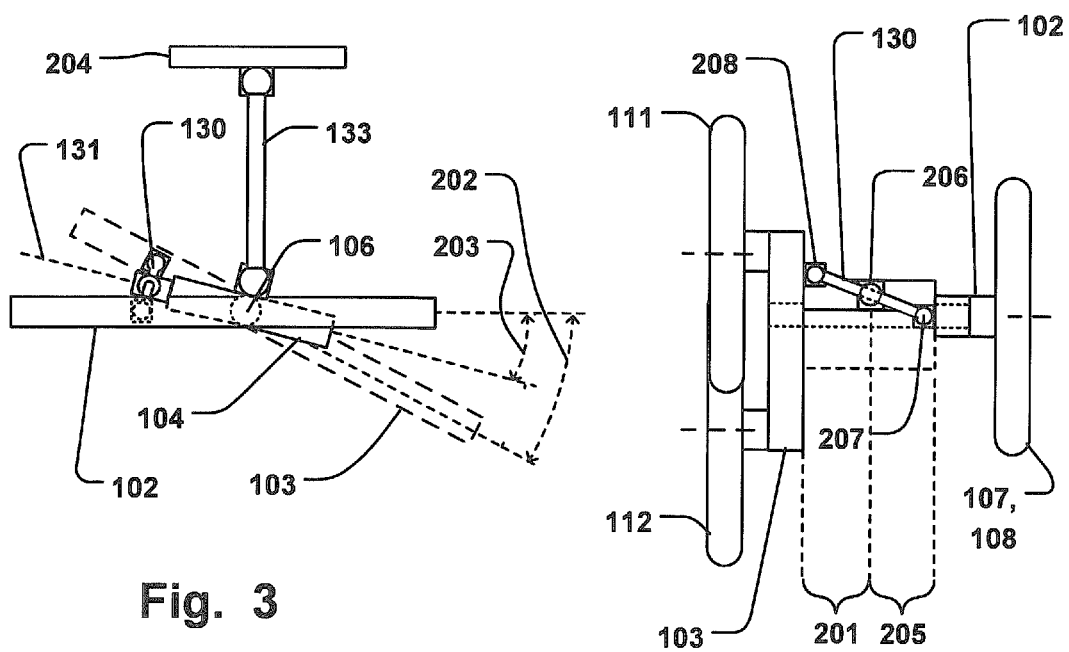
Fig. 3
Fig. 4

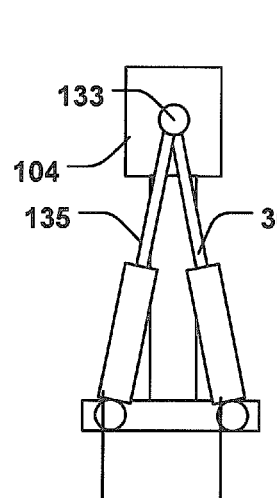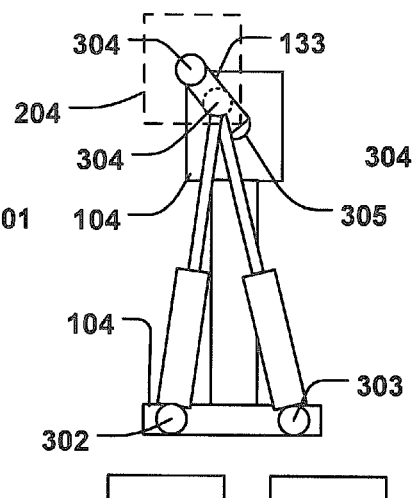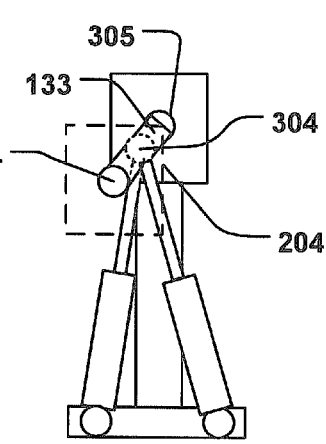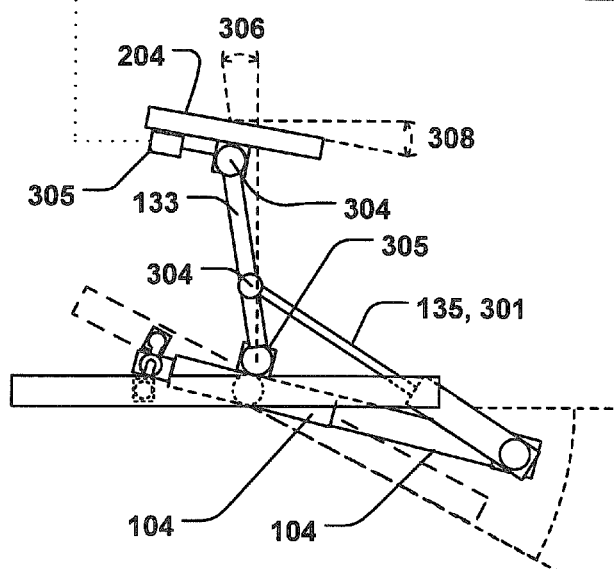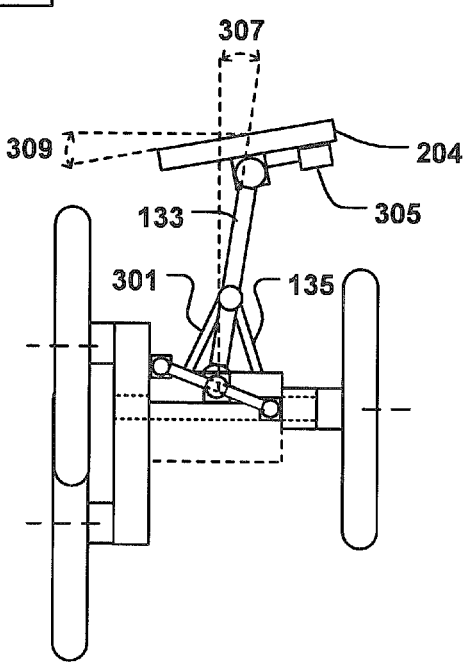
Fig. 5a  Fig. 5b  Fig. 5c
Fig. 6  Fig. 7

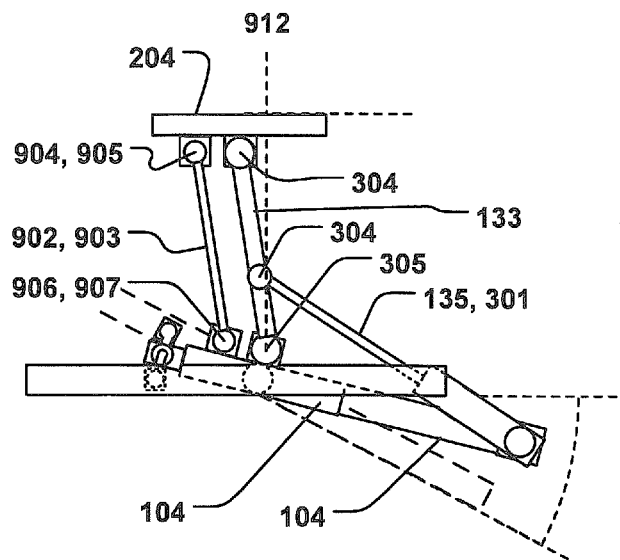
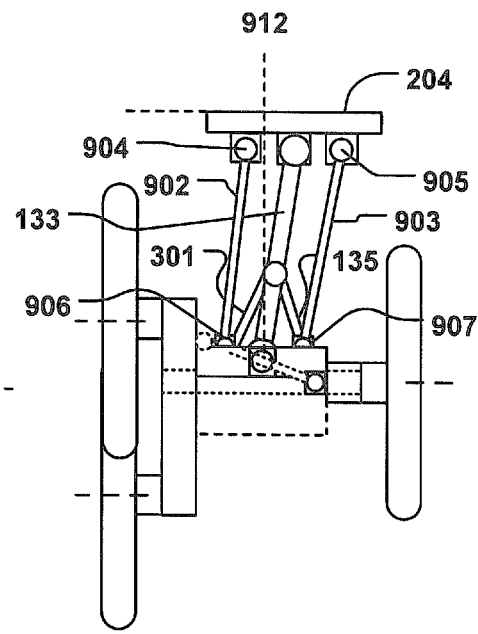
Fig. 9　　　Fig. 10
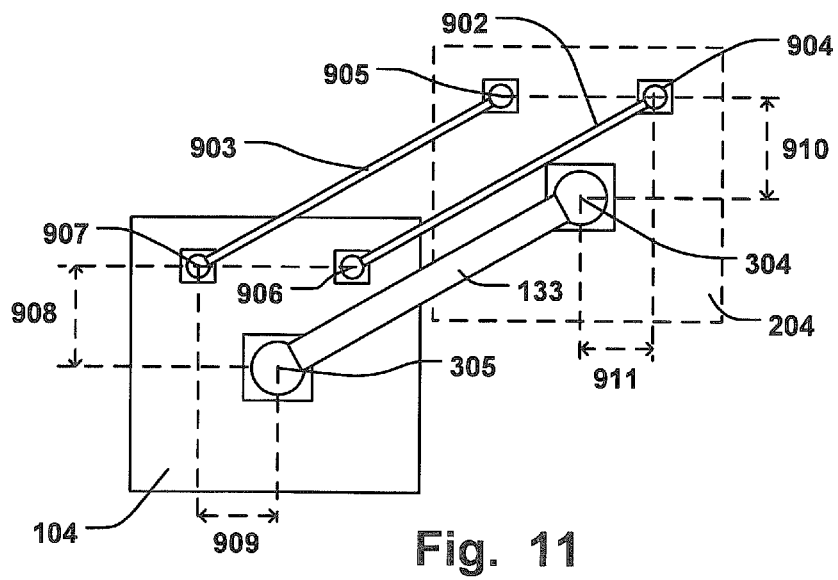
Fig. 11

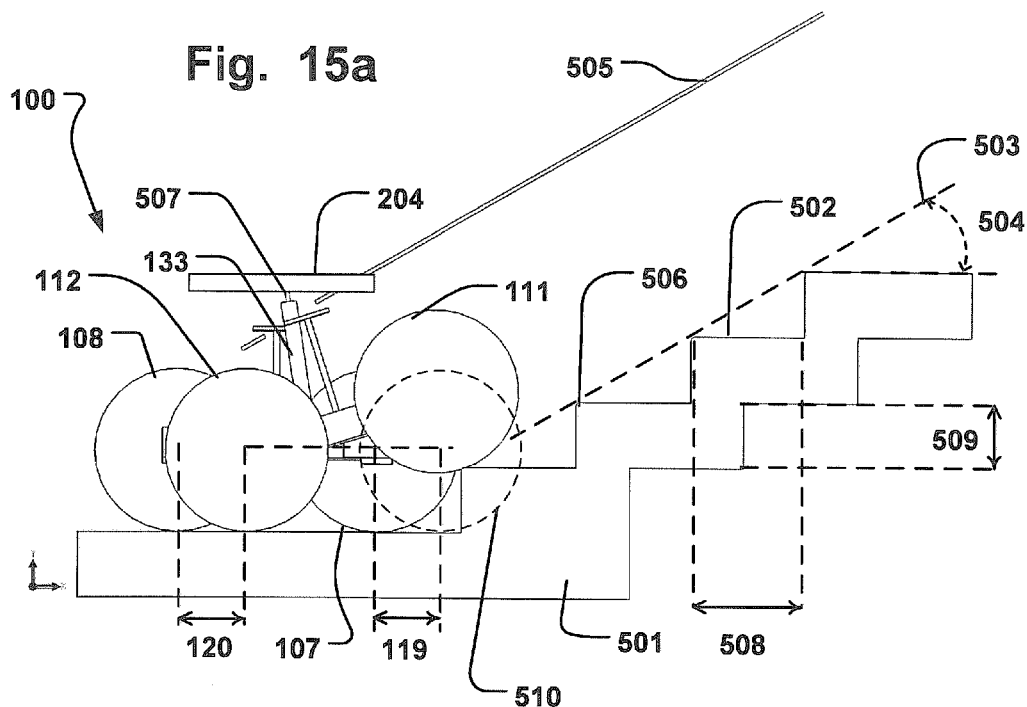
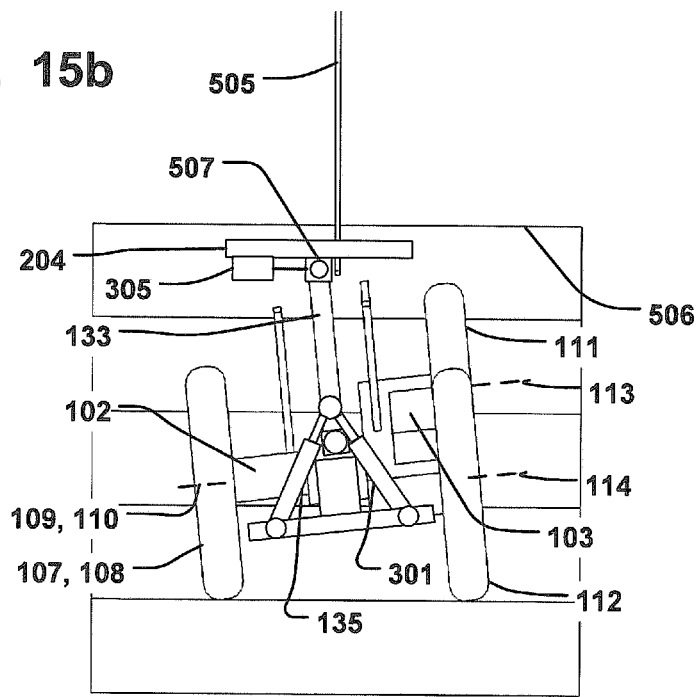

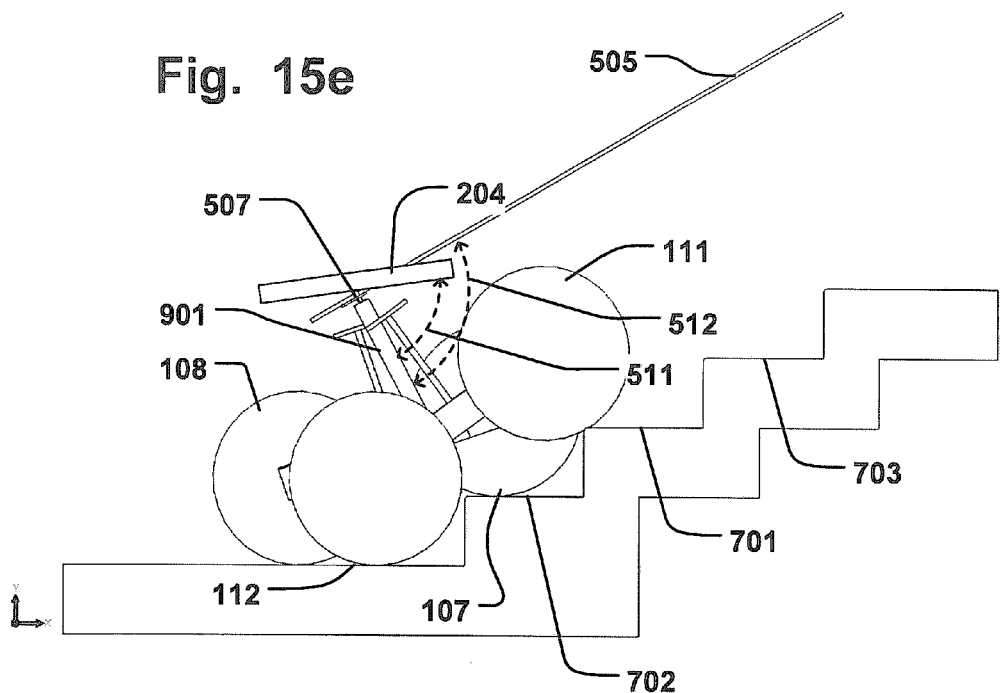
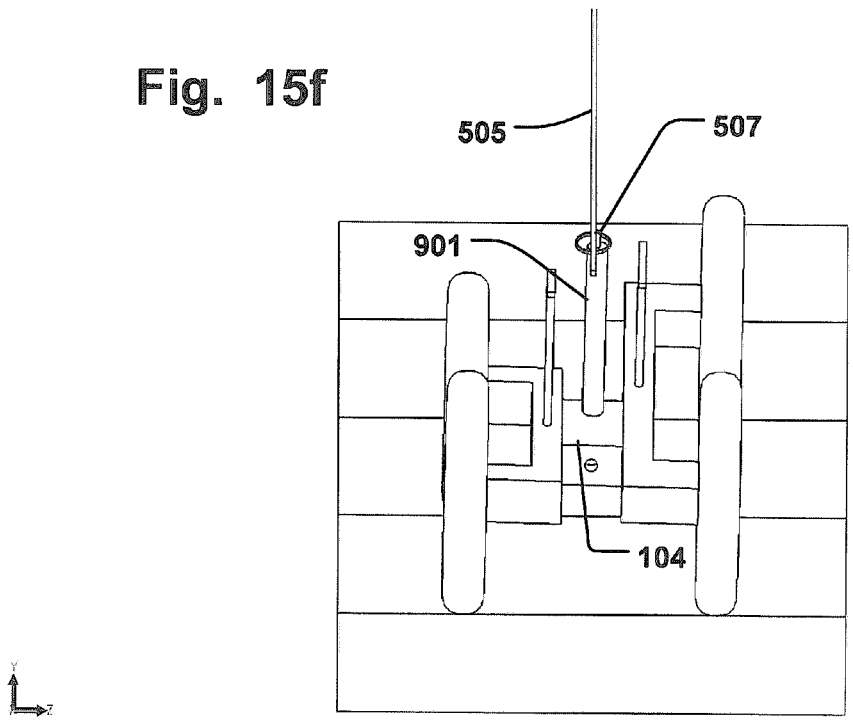

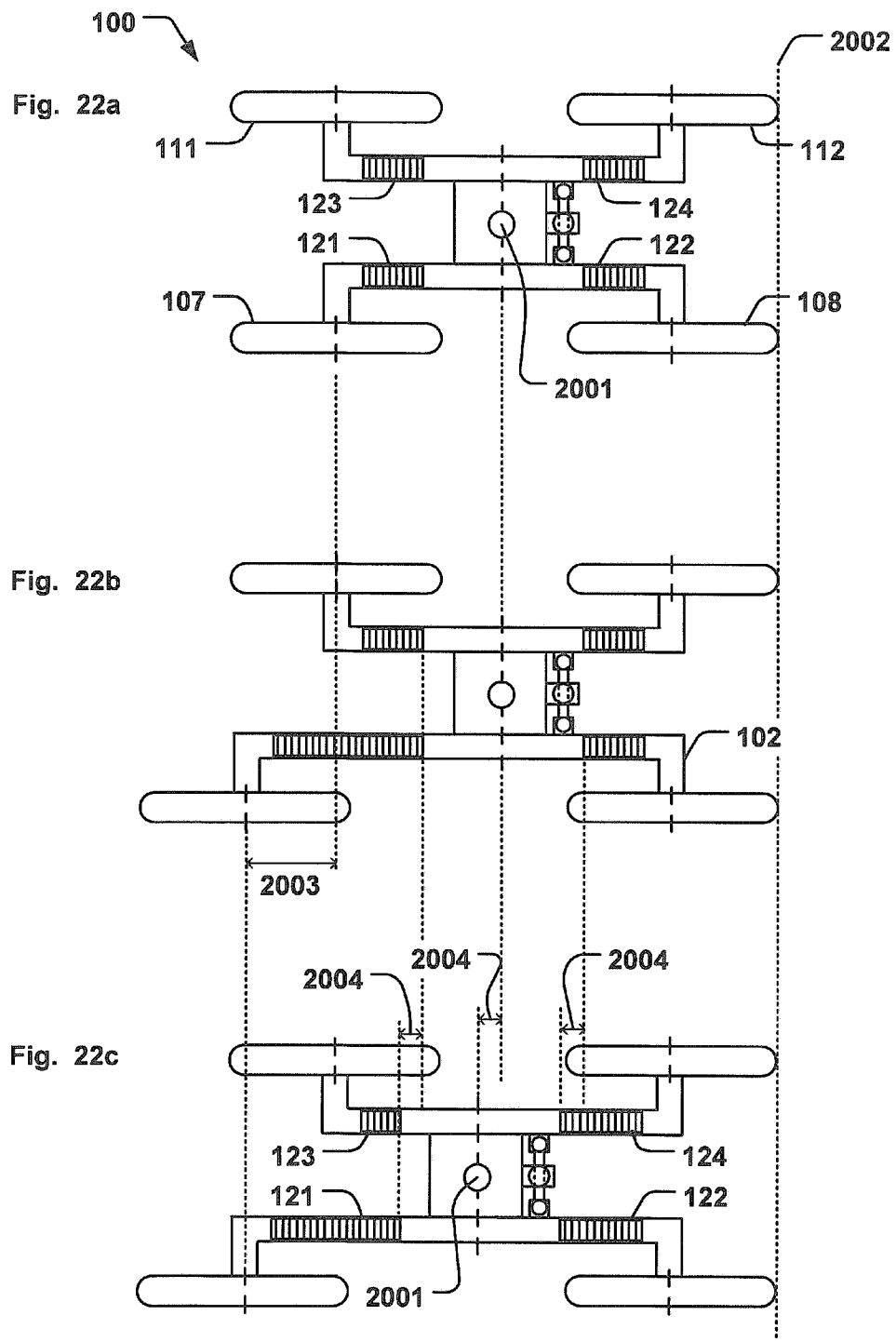

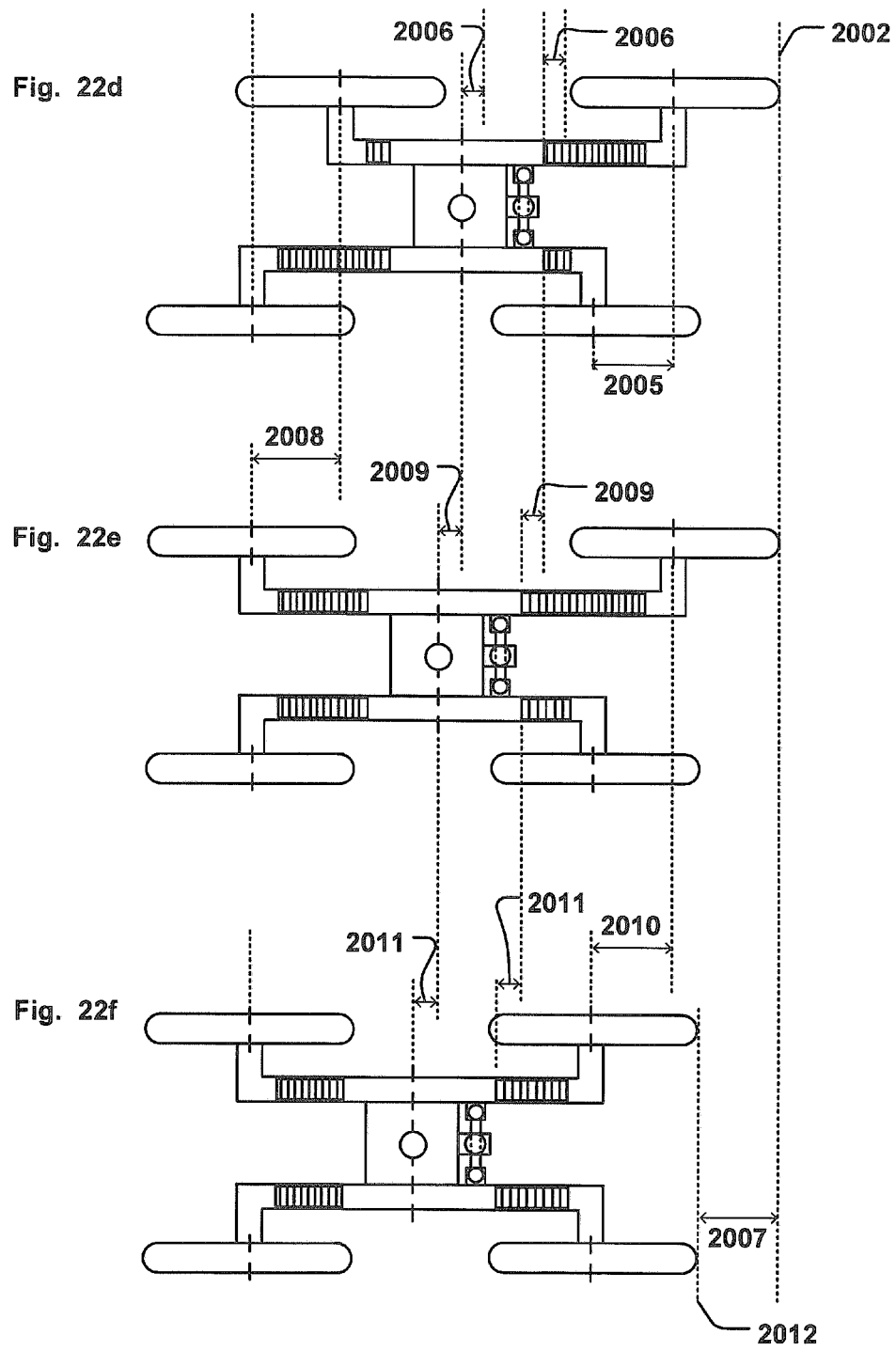

VEHICLE HAVING A LEVEL COMPENSATION SYSTEM

FIELD

The present invention pertains in general to the field of terrain vehicles. More particularly the invention relates to a personal vehicle having at least one level compensating system for compensating for level variations in uneven terrain, especially a stair case, and maintain a stable ride. In embodiments the vehicle comprises a pivoting left and right frame wherein said frames have an offset wheel pair.

BACKGROUND

Many vehicles having level compensation for traversing uneven terrain are known. With regards to vehicles for ascending stair cases different solutions are proposed. For instance, CA 2,227,955 discloses a motorized armchair having two serially connected wheel pairs. A seat may pivot around an axis to maintain a level position in one direction. The large number of serially connected wheels may provide for an increased grip when ascending a stair case, however at the cost of a bulky solution, e.g. when ascending a narrow passage in a stair case.

An issue with prior art vehicles is high weight, in order to provide stability of the vehicle, in particular with a payload of large weight. This limits the practical use of such vehicles, e.g. when wanting to travel in an elevator which has limited surface and load capacity available. Lighter vehicles also need less propelling energy, which is a desired advantage.

U.S. Pat. No. 7,631,380 discloses a spine board having an opposing set of wheel assemblies comprising three wheels for manually maneuvering in stairs.

SU 1833182 discloses a wheel chair for manually surmounting stairs having front driving wheels on a balance arm being pivotable with respect to the wheel chair frame. The front driving wheels are off-set to each other.

U.S. Pat. No. 3,893,533 discloses a recreational motor vehicle for use in rough terrain. The front wheels are offset longitudinally to provide a more stable stance for the vehicle and greater driving traction.

A further issue with prior art is the lack of level compensation that keeps the ride smooth, even when driving in stairs. When ascending or descending the stair each step produce a corresponding zic-zac or rocking motion in the vertical and horizontal directions at the seating position of the vehicle. The lack of level compensation in such terrains also result in an inefficient power transfer and thereby use of energy, as traction is repeatedly lost.

Furthermore, another issue with prior art is the lack of adjustability to different terrains. The user of a personal vehicle may encounter different obstacles, e.g. stairs having varying step dimensions, on a daily basis when moving around in the home environment or a public environment. If the vehicle would be optimized to traverse a staircase at home, it may not be suitable for other obstacles. The need for adjustability of the vehicle is thus important in order to safely and comfortably traversing such varying obstacles. Otherwise several vehicles would be needed, each especially adapted to a particular terrain, due to lack of adjustability, and the user would have to switch vehicles regularly, which may not be possible for a user without help. The degree of freedom and independence could accordingly be improved for the vehicle user.

Hence an improved vehicle and/or method providing a safe and comfortable ride across obstacles having different dimensions would be advantageous and in particular allow for a flexible solution to travel across such varying obstacles.

SUMMARY

Accordingly, embodiments of the present invention preferably seek to mitigate, alleviate or eliminate one or more deficiencies, disadvantages or issues in the art, such as the above-identified, singly or in any combination by providing a vehicle and method according to the appended patent claims.

According to a first aspect of the invention, a vehicle is provided, having a multiple of level compensation systems, the vehicle includes a chassis having a left frame, a right frame, a base plate, a first level compensation system comprising a pivot joint for pivotably connecting the left and right frames to the base plate, whereby the left and right frames are rotatable with respect to each other around a common rotational axis. The left and right frame extends in a direction perpendicular to the rotational axis. The vehicle further includes a left wheel pair comprising a left front wheel and a left rear wheel, the left front wheel and left rear wheels having left rotation axes and being mounted in opposite ends of the left frame, a right wheel pair comprising a right front wheel and a right rear wheel, the right front wheel and right rear wheels having right rotation axes and being mounted in opposite ends of said right frame. At least one first axial distance from a left rotation axis of the left wheel pair to said rotational axis is different from at least one second axial distance from a right rotation axis of the right wheel pair to the rotational axis, such that said left and right wheel pair have at least one off-set to each other.

According to a second aspect of the invention, a method for traversing a stair case with a vehicle according to the first aspect is provided, the stair case having a plurality of steps for traversing in a first direction at a stair angle, the stair case having an axis of inclination parallel to said first direction and perpendicular to step edges, the vehicle having an apex point adjacent to a seat foundation, and left and right wheel pairs having wheels connected to left and right frames, the left and right frames being rotatable with respect to each other, the method comprising adjusting a wheel off-set of at least one wheel of said vehicle based on step dimensions, maintaining said apex point along said axis of inclination during the traversing by applying a first level compensation of a first level compensation system comprising alternating rotational movement of the left and right frames.

A pivot joint is a coupling or union allowing two parts of the joint rotating or turning independently of each other in three dimensional space.

Further embodiments of the invention are defined in the dependent claims, wherein features for the second aspect of the invention is as for the first aspect mutatis mutandis.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which FIG. 2 is a schematic side view from the left of the vehicle of FIG. 1.

FIG. 3 is a schematic detail of FIG. 2.

FIG. 4 is a side view from the left of the detail in FIG. 3 corresponding to a front view of the vehicle in FIG. 1.

FIGS. 5a-c are a schematic detail of the vehicle of FIG. 1.

FIG. 6 is a side view from the detail of FIG. 5b.

FIG. 7 is a front view of the detail of FIG. 5c.

FIG. 9 is a schematic detail view from the left of the vehicle in FIG. 1 according to an embodiment.

FIG. 10 is a side view from the left of FIG. 9.

FIG. 11 is a schematic top view of the detail of FIGS. 9 and 10.

FIG. 15a-j are side and rear views of the vehicle in FIG. 1 when traversing a staircase.

FIG. 22a-f is a schematic top view of a vehicle according to an embodiment of the invention

DETAILED DESCRIPTION

Figure 1:
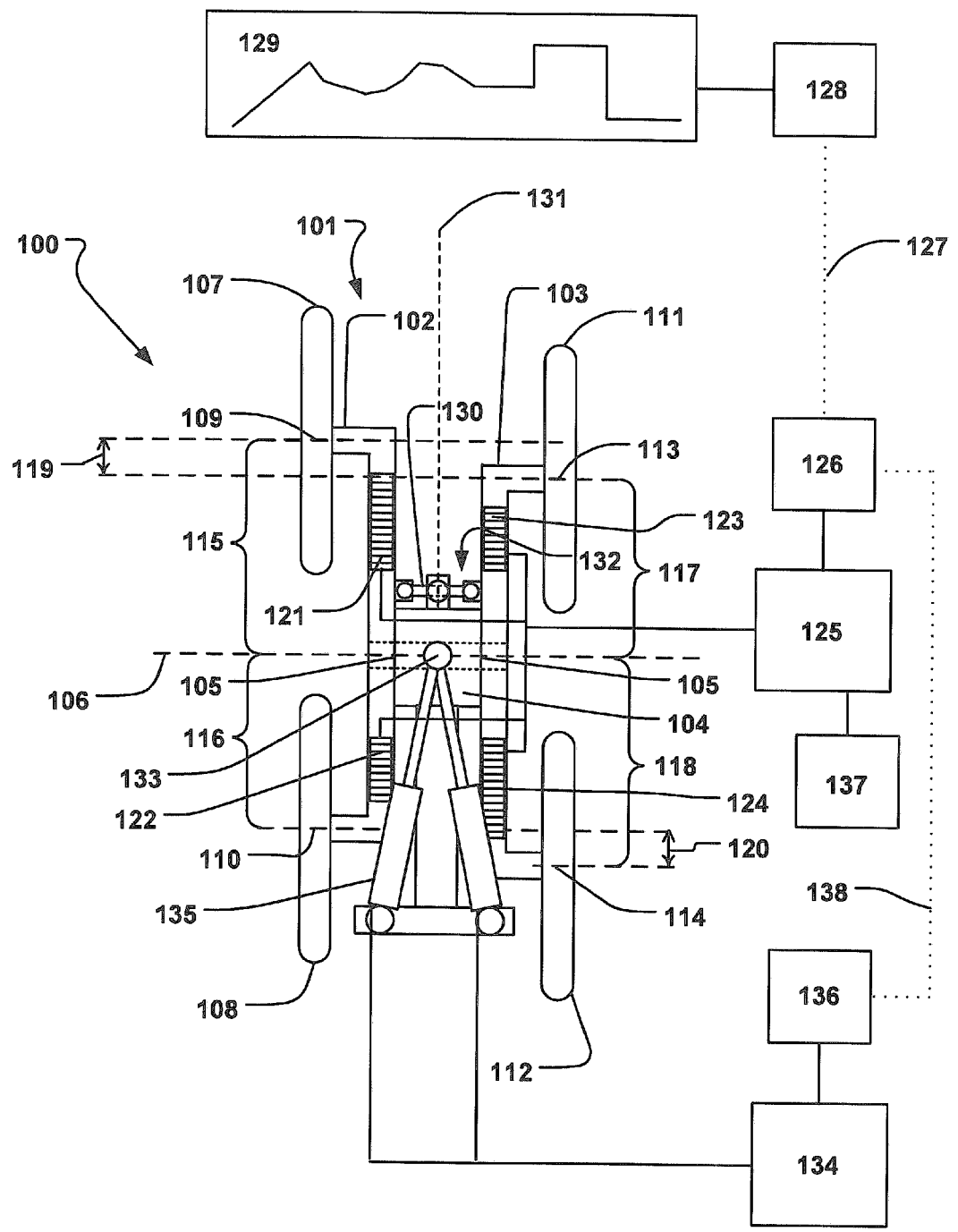
FIG. 1 is a schematic top view of a vehicle according to an embodiment of the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The following description focuses on an embodiment of the present invention applicable to a vehicle for traversing terrain carrying a load, such as a person or goods. However, it will be appreciated that the invention is not limited to this application but may be applied to many other transport applications requiring smooth and even movement across transport surfaces of varying topography.

In FIG. 1, a vehicle 100 according to an embodiment of the invention is shown in a top view. The vehicle comprises a chassis 101 having a left frame 102, a right frame 103, and a base plate 104. The vehicle 100 includes a first level compensation system having a pivot joint 105 on either side of the base plate 104 for pivotably connecting the left and right frames, 102 and 103, to base plate 104 (see also FIGS. 2 and 3). The left and right frames, 102 and 103, are thereby rotatable with respect to each other around a common rotational axis 106 that extends trough the base plate 104. The left frame 102 may rotate clockwise (CW) while the right frame 103 is rotated counter-clockwise (CCW). The left and right frames, 102 and 103, extend substantially in a direction perpendicular to the rotational axis 106. The vehicle 100 has a left wheel pair comprising a left front (LF) wheel 107 and a left rear (LR) wheel 108, the LF wheel 107 and LR wheels 108 having left rotation axes, 109 and 110, respectively. The LF wheel 107 and LR wheel 108 are rotatably mounted in opposite end regions of the left frame 102. Likewise, the vehicle 100 has a right wheel pair including a right front (RF) wheel 111 and a right rear (RR) wheel 112, the RF wheel 111 and RR wheel 112 having right rotation axes, 113 and 114, respectively. The RF wheel 111 and RR wheel 112 are rotatably mounted in opposite end regions of the right frame 103.

At least one first axial distance, 115, 116, from a left rotation axis, 109, 110, of the left wheel pair to the rotational axis 106 is different from at least one second axial distance, 117, 118, from a right rotation axis, 113, 114, of the right wheel pair to the rotational axis 106. Accordingly, by having at least one first axial distance, 115, 116, that is longer or shorter than at least one second axial distance, 117, 118, the left and right wheel pair have at least one off-set, 119, 120, relative to each other. In FIG. 1 a frontmost first axial distance 115 is longer than a frontmost second axial distance 117, whereby LF wheel 107 has a left offset 119 to the RF wheel 111. Further, a rearmost first axial distance 116 is shorter than a rearmost second axial distance 118, whereby the RR wheel 114 has an right offset 120 to the LR wheel 108. The offsets 119 and 120 may be different from each other and any of wheels 107, 108, 111, and 112 may have an offset relative to one another.

The offsets, 119 and 120, are substantially in the direction of extension of the left and right frame, 102 and 103, which is substantially in the driving direction of the vehicle 100, such that when the vehicle 100 drives on a flat surface and approaches a vertical step, the frontmost wheel, i.e. LF wheel 107, having offset 119 approaches the vertical step before the LR wheel 111. By having an offset, 119, 120, the likelihood of total wheel contact with the transport surface of the vehicle is increased as the surface may contain irregularities such as holes, piles, or steps, that displace any of the wheels 107, 108, 111, or 112 in the vertical direction. For instance as the LF wheel 107 approaches an irregularity such as a vertical step, and becomes initially displaced, e.g. by loosing grip. Surface contact is however maintained thanks to the pivoting split frame. The RF wheel 111 trailing behind with offset 113 has not yet approached the step and maintains full contact and grip with the flat transportation surface before the step. The total amount of available traction is thereby increased and the available grip of the wheels not displaced in the vertical direction of the step may be sufficient to push the frontmost offset wheel over the step. Subsequently as the foremost wheel 107 traverses the obstacle it regains grip and traction and is able to pull the RF wheel 111, that is approaching the step and becomes displaced, over the same step. The amount of wheel contact is thereby increased at each instance in time when traversing such obstacles with offset wheels. At the same time energy consumption is reduced.

The pivoting action of the left and right frames, 102, 103, interplays with aforementioned offset configuration by alternating rotation of the left and right frames, 102, 103, to compensate for vertical displacement of any offset wheels 107, 108, 111, and 112. This compensation is to be construed as a first level compensation of a first level compensation system of the vehicle 100. FIG. 2 is a side view from the left of the vehicle 100 in FIG. 1, showing a selection of details of the vehicle 100 when right frame 103 is rotated CW with respect to left frame 102. Driving the vehicle 100 in a reverse direction corresponds to movement to the right of the vehicle in FIG. 2, e.g. when descending down an irregularity such as a hole in the transportation surface. The rearmost wheel, RR wheel 112 having aforementioned offset 120, approaches the hole, whereby the right frame 103 pivots CW to allow RR wheel 112 to approach a lowered contact surface in the descent. A loss of surface contact of RR wheel 112 is minimized if not avoided, while the horizontal left frame 102 allow the left wheel pair with LF and LR wheels, 107, 108, to stay in contact with the transportation surface to maximize grip and traction. A further example will be described in relation to FIGS. 15a-j showing the interaction between the level compensation of the pivoting left and right frames, 102, 103, and the offset configuration of wheel pairs of the vehicle 100 when ascending a stair case.

The distance between left rotation axes, 109 and 110, may be the same as the distance between right rotation axes, 113 and 114. Accordingly the front first axial distance 115 may be the same as the rear second axial distance 118, and the rear first axial distance 116 may be the same as the front second axial distance 117. The front offset 119 is in this case substantially equal to the rear offset 120. The symmetric offset configuration may provide an increased stability and smooth ride when traversing a symmetric surface topography, such as a stair.

The vehicle 100 may comprise at least one wheel displacement unit, 121, 122, 123 and 124, arranged to displace the LF wheel 107 in relation to the RF wheel 111, and/or the RF wheel 111 in relation to the LF wheel 107, and/or the LR wheel 108 in relation to the RR wheel 112, and/or the RR wheel 112 in relation to the LR wheel 108. In the embodiment in FIG. 4, four wheel displacement units 121, 122, 123 and 124 are shown. It may be sufficient to have only one wheel displacement unit that displaces the left or right wheel pair in relation to each other. By displacing at least one of the LF wheel 107 and LR wheel 108 in relation to at least one of the RF wheel 111 and RR wheel 112 the offset, 119, 120, may be adjusted to fit the topography of the transportation surface. If traversing two different series of obstacles, such as two series of steps, where the step dimensions are different relative to each other, a larger offset may be more suitable for the series of steps with larger step dimensions, and likewise a smaller offset may be more suitable for the smaller steps.

The vehicle 100 may comprise a frame control unit 125 adapted to provide off-set values, wherein the wheel displacement unit comprises left frame actuators, 121, 122, and right frame actuators 123, 124. The left and right frame actuators, 121, 122, 123, 124, are operatively connected to the frame control unit 125. The left frame actuators 121, 122, are arranged to adjust at least one of the first axial distances 115, 116, by displacement of the wheels 107, 108, of the left wheel pair relative to each other. Likewise, the right frame actuators 123, 124, are arranged to adjust at least one of the second axial distances 117, 118, by displacement of the wheels 111, 112, of the right wheel pair relative to each other. The displacements are based on the off-set values provided by the frame control unit 125 to provide the offset 119, 120. The frame actuators 121, 122, 123, 124, may be linear actuator elements capable of expanding or contracting in dimension, in the direction of the extension of the left and right frames 102, 103, to provide the offset 119, 120 in the driving direction of the vehicle.

The linear actuator elements may be based on hydraulic, electrical, and mechanical operation, or any combination thereof. The control unit 125 communicates with the frame actuators 121, 122, 123, 124 and provides offset values depending on which offset 119, 120, of the wheels 107, 108, 111, 112, that is desired to fit the current topography of the transportation surface.

Figure 8A:
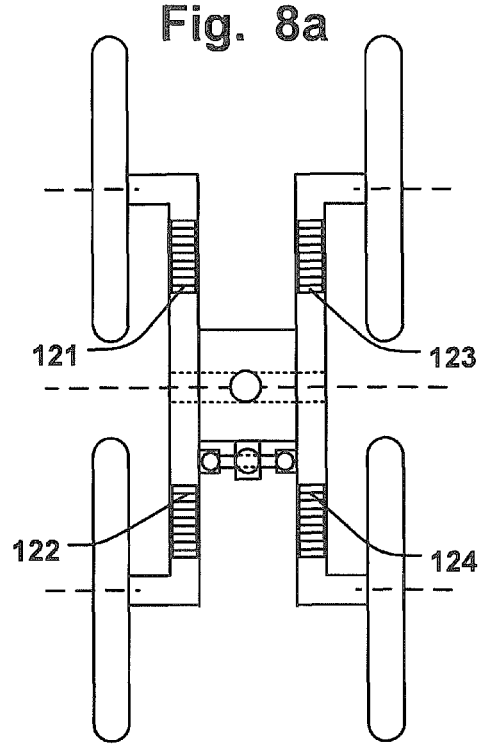
FIGS. 8a-c are schematic details of the vehicle of FIG. 1 in configurations for traversing topographies.
Figure 8B:
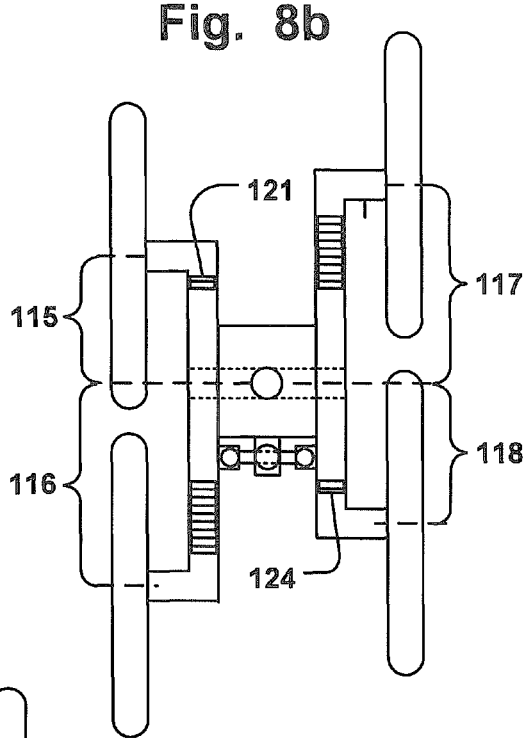
Figure 8C:
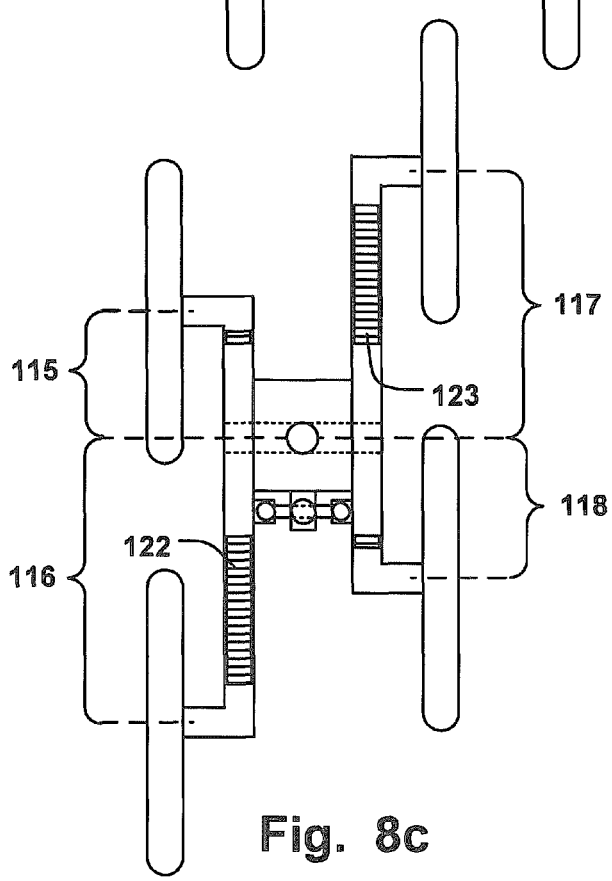

FIG. 8a-c show different configurations of the left and right frames 102, 103. FIG. 8a show the vehicle 100 without any offset of the wheels 107, 108, 111, 112. This example of a configuration may be suitable for transportation on certain surfaces that do not benefit from the wheel offset. In FIG. 8b left frame actuator 121 and right frame actuator 124 are contracted, whereby the first axial distance 115 and second axial distance 118 has decreased in length. In FIG. 8c left frame actuators 122 and right frame actuator 123 are expanded, whereby the first axial distance 122 and second axial distance 123 has expanded in length. Other offset configurations may readily be apparent to the skilled person when reading the present disclosure.

The off-set values provided to the frame actuators 121, 122, 123, and 124, by the frame control unit 125 may be set according to a plurality of pre-defined values defined by a vehicle user. For example, the vehicle user may define offset values at 80 mm and 160 mm in the frame control unit 125. The frame control unit 125 sends these values to the frame actuators, that displace at least one of the wheels 107, 108, 111, and 112 such that an front offset 119 or rear offset 120 (e.g. at the example of 80 mm or 160 mm) is set. This is advantageous as the user may travel across a number of reoccurring surfaces during a day. E.g. stairs of different dimensions, or country roads with pot holes. The surface may have different optimized settings of the offset 119, 120, that can be pre-set and subsequently quickly selected by the user when approaching these different surfaces.

In some embodiments the vehicle 100 comprises a transport surface detection unit 126 operatively connected to the frame control unit 125, and a data memory 137 operatively connected to the frame control unit 125. The transport surface detection unit 126 provides topographical information of the vehicle transport surface to the frame control unit 125. The off-set values sent to the frame actuators 121, 122, 123, 124, are based on this topographical information. The topographical information comprises dimensional data elements of the transportation surface and may be stored on the data memory 137. For example, the detection unit 126 may detect a vertical edge 200 mm above the transportation surface ahead of the vehicle 100 and return this dimensional data to the frame control unit 125 where it can be stored on the memory 137. A plurality of dimensional data elements may be stored on the memory 137 in case the detection unit 126 detect several edges of different dimensions. The frame control unit may compute suitable offset values based on this dimensional data according to a pre-stored algorithm or a look-up table for translating the dimensional data to offset values for setting an offset 119, 120 that is suitable for the topography dimensions. The surface detection unit 126 may provide the topography data automatically such that no input has to be made by the vehicle user, and no pre-selection of offset values has to be made.

The surface detection unit 126 may comprise a receiver adapted to receive the dimensional data elements over a communication link 127, that may be a wireless communication link. The dimensional data may be stored on a terrain memory 129 connected to a transmitter 128 located for example in the proximity of an obstacle, such as a staircase. The terrain memory 129 may pre-store the dimensional data of the current stair that is approached by the vehicle user, and the transmitter 128 may subsequently transmit the information to the receiver in the surface detection unit 126 of the vehicle 100 over the communication link 127. The suitable offset 119, 120 can then be set depending on the dimensions of the staircase, which can be made without the need for a new analysis of the topography.

The communication over link 127 may be based on electromagnetic communication such as rfid, bluetooth, GSM, WIFI, infrared light, or acoustic communication, or any other technique allowing for wireless communication. Accordingly the transport surface detection unit 126 may comprise a sensor such as an optical sensor, and/or a photographic sensor, and/or an electromagnetic sensor such as an rfid sensor, and/or an acoustic sensor. The transport surface detection unit 126 may also comprise a distance measurement unit such as an optical topography scanner unit, a radar unit, or a laser measurement unit that can measure the dimensions of for example a stair case, such as the step dimensions. Any other technique for measuring the topography may be used for providing the dimensional data to the frame control unit 125. The vehicle 100 may have a GPS unit (not shown) for receiving information about the topography at the current coordinates and adjust the offset 119, 120 accordingly. The vehicle 100 may comprise a terrain recorder (not shown) adapted to store topography information based on the movement of the wheels and left and right frames of the vehicle. For instance, the vehicle user may force an obstacle such as a staircase, and the dimensions of the steps will be recorded by the terrain recorder, whereby the next time the same staircase is to be traversed, the offset 119, 120, is optimized according to the recorded dimensional data in the recorded information.

Figures 17A, 17B:
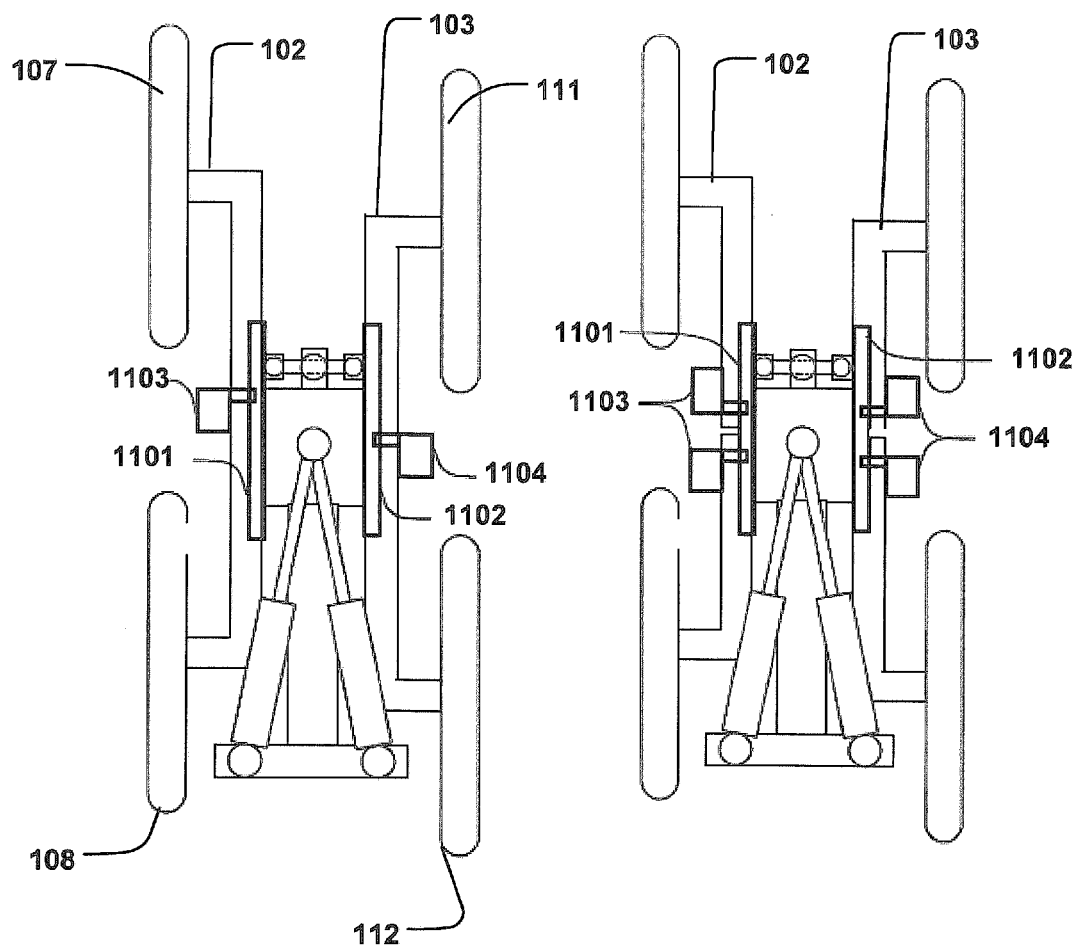
FIG. 17a-b show schematic details of the vehicle of FIG. 1 according to an embodiment.

FIGS. 17a-b shows another embodiment for allowing adjustment of the offset 119, 120. At least one of the left and right frames 102, 103, comprises a at least one locking unit 1103, 1104, and at least one slidable member 1101, 1102 arranged to provide sliding movement between at least one of the left and right frames 102, 103, and the base plate 104. Whereby at least one of the LF wheel and LR wheel may be displaced in relation to at least one of the RF wheel and RR wheel. The at least one locking unit 1103, 1104 is arranged to fix the position of at least one of the left and right frames 102, 103, in relation to the base plate 104. This provides the possibility to adjust the offset 119, 120, easily by unlocking the left and right frames 102, 103, by the locking unit 1103, 1104, and for example brake the left wheels 107, 108, and drive forward with right wheels 111, 112, for example by 80 mm, thus the wheels are used as wheel displacement units such that the offset 119, 120 is changed to 80 mm. Then locking unit 1103, 1104 locks the left and right frames 102, 103, such that they do not slide by the sliding member 1101, 1102, and are fixed in relation to each other again. The left wheels 107, 108 may also drive in reverse by 40 mm, and the right wheel drive forward by 40 mm when the left and right frames 102, 103, are unlocked in order to provide the same 80 mm offset. The movement of the left and right frames 102, 103, in relation to each other and in relation to the base plate 104 is possible due to the slidable member 1101, 1102.

As seen in FIG. 17b, each wheel may have a locking unit 1103, 1104. In this case the left and right frames 102, 103, each have a front and rear part that can be moved in relation to each other, as in the case where the left and right frames 102, 103, have frame actuators 121, 122, 123, 124. For instance, only RF wheel 111 may be offset by unlocking the front part of the right frame 103, and brake the other wheels and drive forward with RF wheel 111 such that the desired offset 119 is obtained, and then lock the frame again by the locking unit.

The slidable members 1101, 1102 are preferably arranged such that common rotation axis 106 can may be maintained regardless of the relative movement of left and right frames 102, 103, and base plate 104.

The first level compensation system of the vehicle 100 may comprise a base plate levelling unit 132 arranged to reduce a rotational movement of the base plate around rotational axis 106 upon rotation of the left and right frames, 102 and 103, around the same rotational axis 106. The base plate 104 may be used as a base for mounting a drivers seat to the vehicle 100. Reducing the movement of the base plate 104 when for example traversing a stair case or any other terrain that induce alternating CW and CCW rotational movement of left and right frames 102, 103, provides a more stable and smooth ride. The levelling unit 132 also functions to stabilize the base plate 104 by having the function as a structural support that prevents uncontrollable rotation of the base plate 104 around rotational axis 106.

As seen in FIGS. 1, 3 and 4, the base plate levelling unit 132 may comprise a base linkage 130 pivotably connected to the base plate 104 by central pivot joint 206 at a center distance, 201, 205, c.f. FIG. 4, between the left and right frames, 102, 103. The base linkage 130 is thereby rotatable with respect to the base plate 104 around a pivot axis 131 which is perpendicular to the rotational axis 106, c.f. FIG. 1. In FIG. 4, showing a view from the left of FIG. 3, the ends of the base linkage 130 are pivotably connected to the left frame 102 by pivot joint 207 and likewise pivotably connected to the right frame 103 by pivot joint 208. The pivot joints 206, 207, and 208 may be spherical bearings that allow pivoting of the base linkage 130 in three dimensions. The base linkage 130 may slide freely trough the central pivot joint 206 to allow for translational movement of the base linkage 130 in a direction perpendicular to the pivot axis 131. The spherical bearing of the central pivot joint 206 may in this case have a hole trough the centre to accommodate the base linkage 130.

In FIG. 3 a side view from the left of the vehicle 100 in FIG. 1 is shown, where details of the base plate 104, left and right frames 102, 103, and base linkage 130 are shown. Upon a rotation of the left and right frames 102, 103, around the rotational axis 106 the right frame 103 will have a first angular displacement 202 in relation to the left frame 102, and the base plate 104 will have a second angular displacement 203 in relation to one of the left and right frames 102, 103. Due to the position of the connection of the base linkage 130 to the base plate 104 by the pivot joint 206, between the left and right frames 102, 103, the second angular displacement 203 is less than the first angular displacement 202.

With reference to FIG. 4, if the distances 201 and 205 are equal the second angular displacement 203 of the base plate 104 will be substantially half of the first angular displacement 202. The base plate 104 will accordingly only be displaced the half amount compared to the left and right frames 102, 103, and will at the same be stabilized by the base linkage 130. The base linkage 130 may be close to the rotational axis 106 to allow a larger rotation angle of left and right frames 102, 103 about the rotational axis 106.

The base plate levelling unit may comprise other means for stabilizing and reducing motion of the base plate 104. A resilient member (not shown) such as a spring or elastic polymer may be used to connect the base plate 104 with left and right frames 102, 103 in a similar configuration as the base linkage 130 such that rotation of left and right frames 102, 103, stretch or relax the resilient member while the base plate is kept at half the displacement angle of the left and right frames 102, 103. The base linkage 130 may also comprise a resilient or expandable portion for allowing an increased rotational angle between left and right frames 102, 103.

Figure 15C:
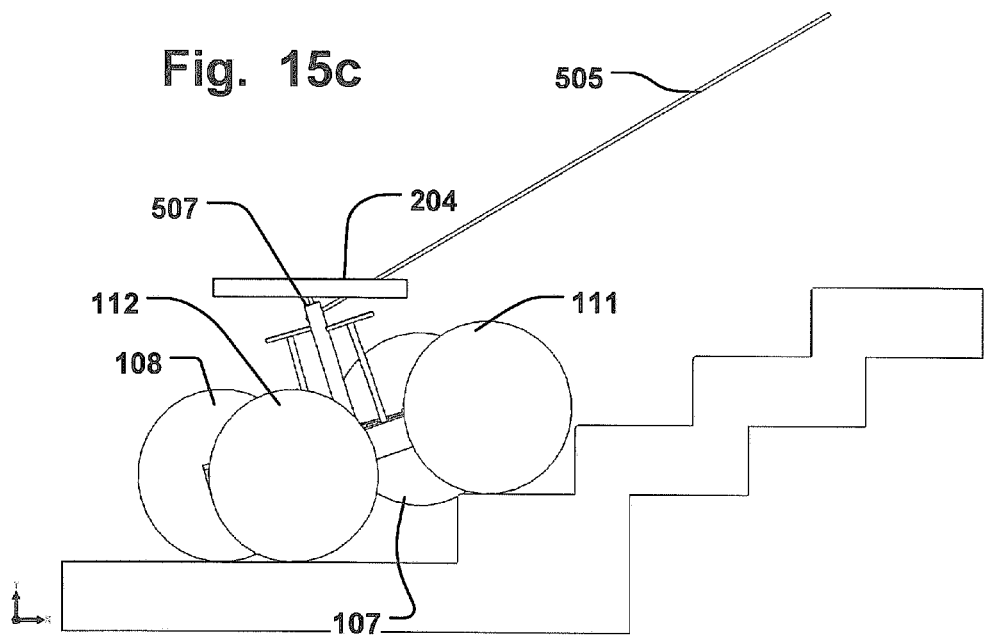

FIGS. 15*a-j* show the vehicle 100 from a side and rear view when traversing a stair case 501 in a number of sequences. FIG. 15*a* and FIG. 15*b* show the same position of the vehicle 100, and likewise for the remaining FIG. 15*c-j*. With reference to FIG. 15*a*, the stair case has a plurality of steps 502, which defines a first direction 503 of the stair case 501 at a stair angle 504 in which the vehicle 100 traverse. The stair case 501 has an axis of inclination 505 which is parallel to the first direction 505 and perpendicular to step edges 506. The step edge 506 is to be construed as the substantially horizontal line that trails the edge 506 of each step 502. The axis of inclination 505 is a reference axis that is fixed in space in relation to the stair case 501.

The vehicle 100 has an apex point 507 adjacent to a seat foundation 204, and left and right wheel pairs having wheels 107, 108, 111, 112 connected to left and right frames 102, 103. The position of the apex point 507 is fixed in relation to the vehicle 100. The left and right frames 102, 103 are rotatable with respect to each other around rotation axis 106 as previously described. The dashed wheel outline 510 in FIG. 15*a* is for clarifying the offset 119 before the right frame 103 has rotated in the CCW direction.

Figure 18:
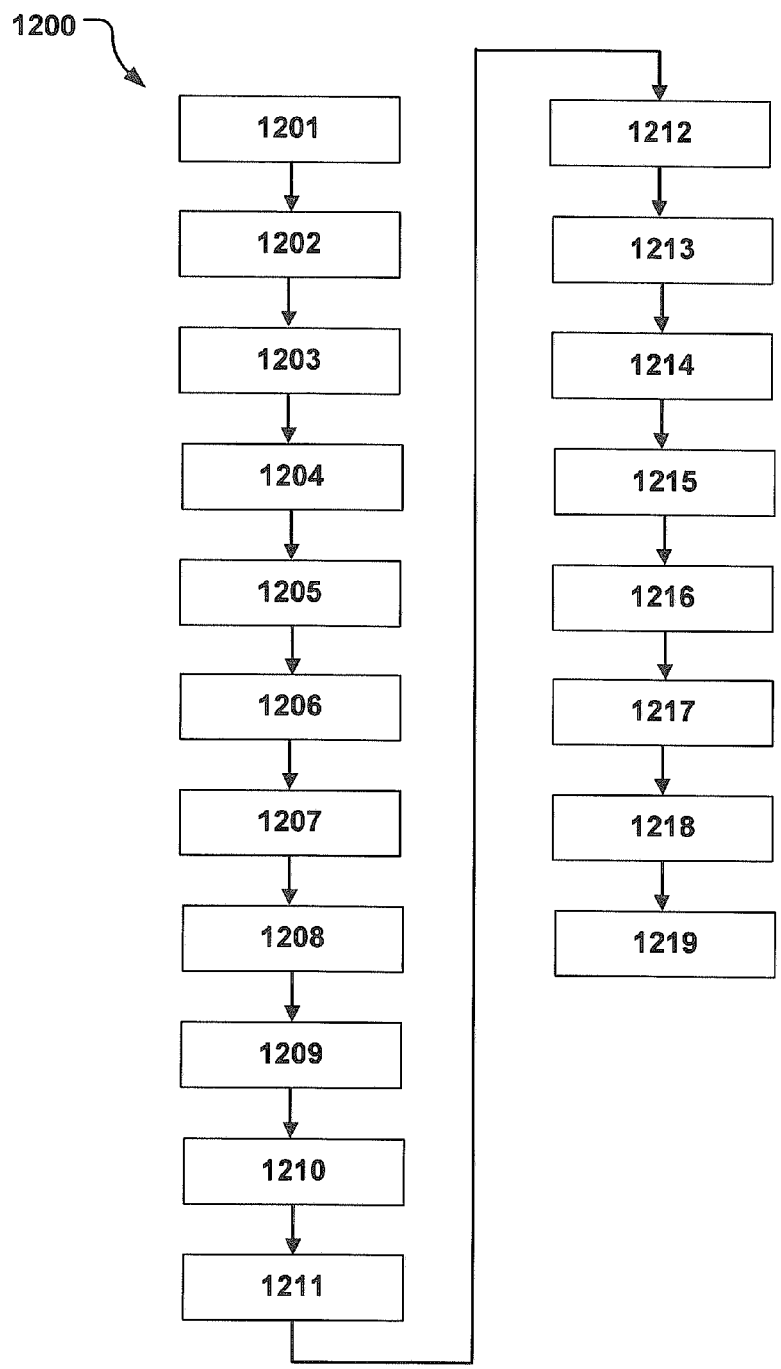
FIG. 18 illustrates a method according to an embodiment.

When traversing the stair case 501 the wheel off-set 119, 120 of at least one wheel of the vehicle 100 is adjusted based on step dimensions 508, 509. The vehicle may have a right and left wheel cluster, with varying number of wheels respectively. The cluster may be a pair of wheels as shown in the figures. FIG. 18, shows a method 1200, comprising this step 1201 of adjusting a wheel off-set of at least one wheel of said vehicle based on step dimensions. In FIG. 15*a-j* the offset 119 of the RF wheel 111 is substantially equal to offset 120 of the RR wheel 112. Subsequently, FIG. 15*a-j* shows the vehicle 100 driving in the first direction 503. The apex point 507 is maintained along the axis of inclination 505 during the traversing as a first level compensation of the first level compensation system is applied by alternating rotational movement of the left and right frames 102, 103. FIG. 18 shows a method comprising this step 1202 of maintaining said apex point along said axis of inclination during said traversing. This is particularly shown with reference to FIG. 15*e-j* where initial asymmetry in the motion of the ascent is absent. In FIG. 15*a-d* the front wheels 107 and 111 surmount the first step which cause the apex point 507 to displace from the axis of inclination 505. This displacement may be corrected by applying level compensation of a second level compensation system as will be described further below.

Figure 15D:
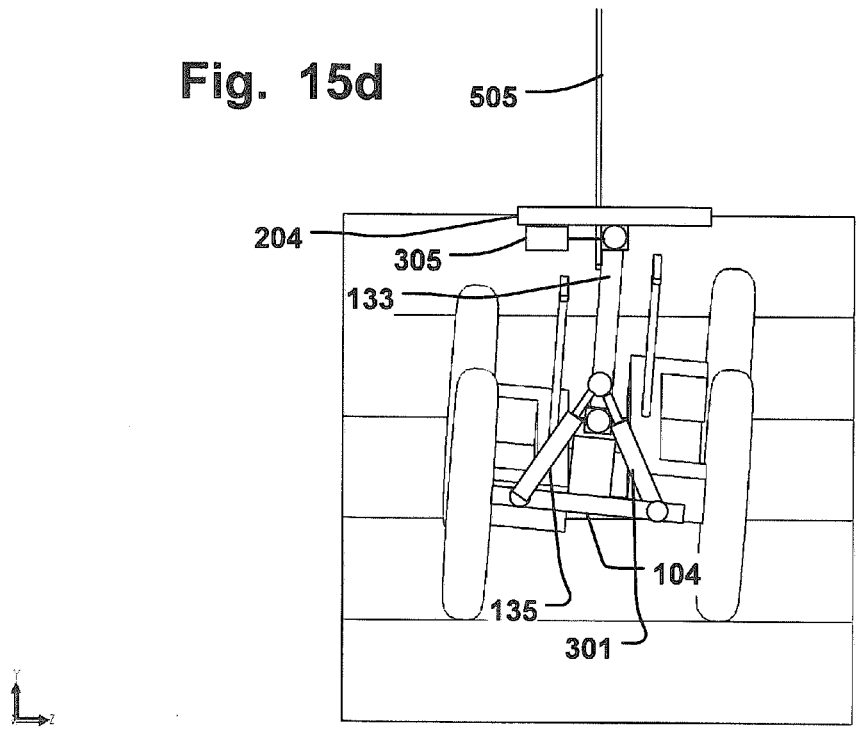
Figure 15G:
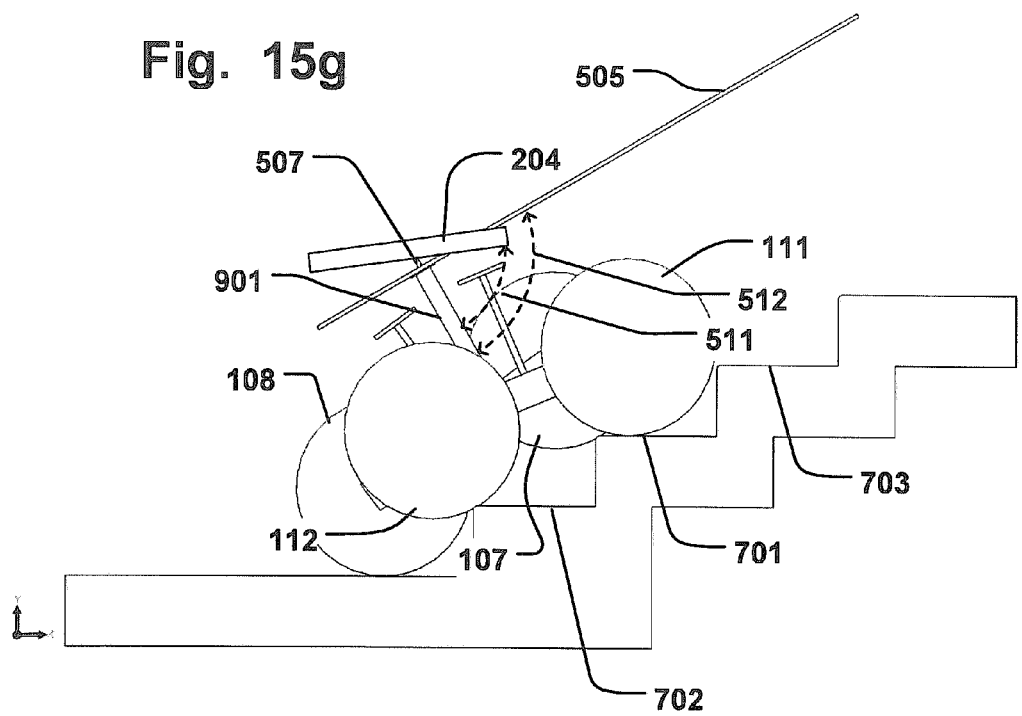
Figure 15H:
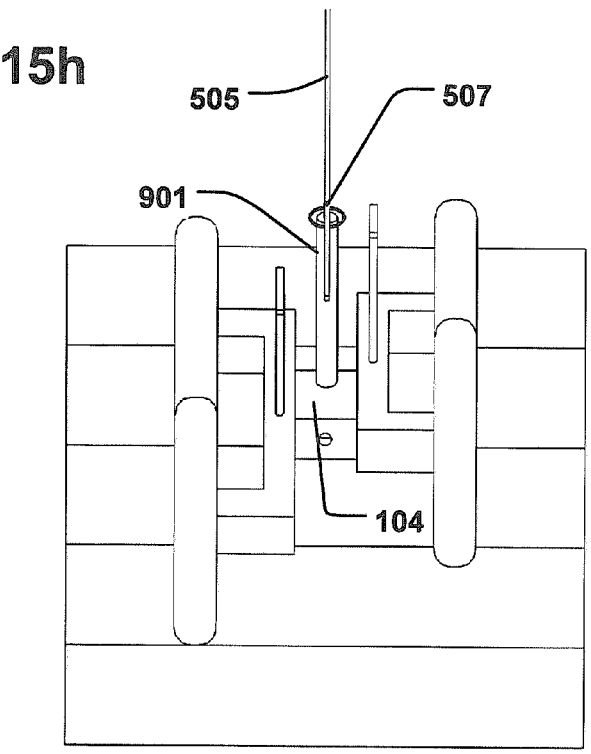
Figure 15I:
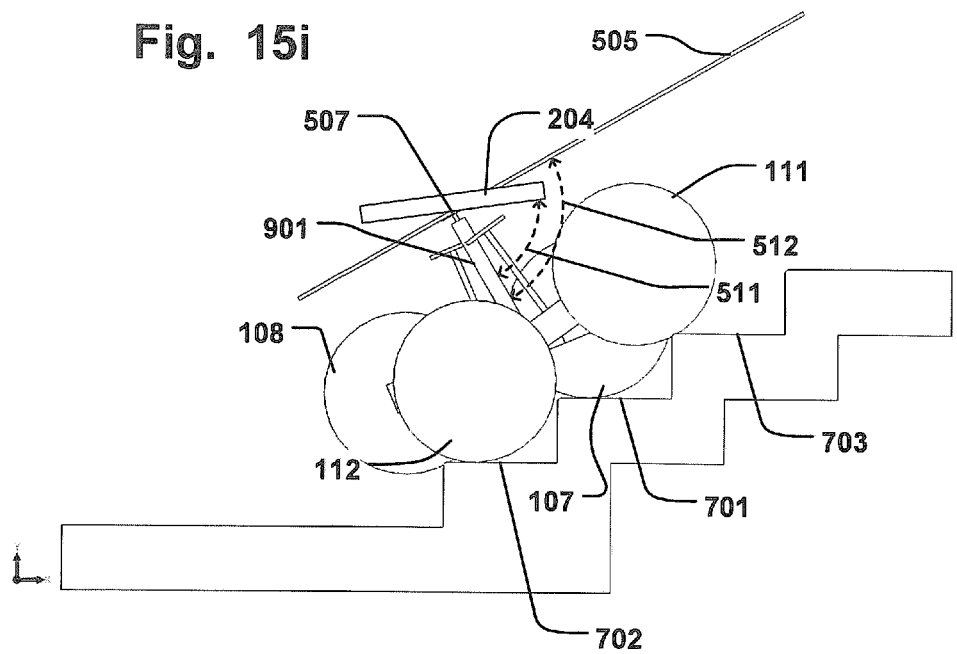
Figure 15J:
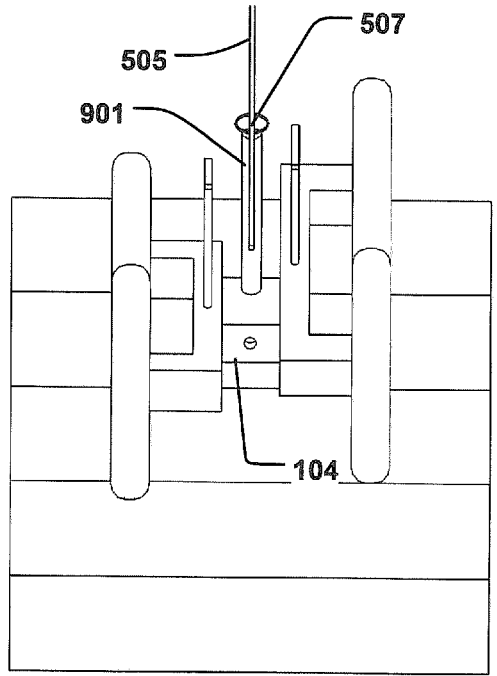

The seat foundation 204 is not shown in FIGS. 15*f*, 15*h*, and 15*j*, in order to show movement of the apex point 507 more clearly.

FIG. 15*e* shows a partial surmounting of a middle step 701 with the right frontmost wheel of the right wheel pair, RF wheel 111. The RF wheel 111 has offset 119 in relation to LF wheel 107. Right frame 103 rotates CCW as RF wheel 111 partial surmounts middle step 701. The apex point 507 is at the axis of inclination 505. Due to the offset 119, 120, wheels 107, 108, 112 have full surface contact and provide sufficient traction for the next movement over steps 502.

The following movement in the sequence is displayed in FIG. 15*g* showing a partial surmounting of the middle step 701 with the LF wheel 107, whereby left frame 102 rotates CCW. Simultaneously the frontmost wheel 111 fully surmounts the middle step 701, and the RR wheel 112 of the right wheel pair partially surmounts a lower step 702 below the middle step 701, whereby the right frame 103 rotates CW. In the movement wheel 111 regains full surface contact and traction while LF wheel 107 loose the same. The apex point 507 is maintained at the axis of inclination 505.

FIG. 15*i* shows a partial surmounting of an upper step 703 above the middle step 701 with the frontmost wheel 111, whereby the LF wheel 107 fully surmounts the middle step 701 and regains grip. As the right frame 103 rotates CCW left frame 102 rotates CW. Simultaneously the RR wheel 112 fully surmounts the lower step 702, and the left rearmost wheel of the left wheel pair, LR wheel 108, partially surmounts the lower step 702. By having an offset 120 RR wheel 112 regains full surface contact and traction when LR rearmost wheel 108 looses surface contact, and likewise for LF wheel 107 and RF wheel 111. The apex point 507 is still maintained at the axis of inclination 505, and will continue to be maintained at this axis as the vehicle 100 traverses subsequent steps 502, with a constant angle 512 between support 901 and axis 505. The seat foundation 204 in FIGS. 15*e*, 15*g*, and 15*j* may accordingly be kept at a constant angle in relation to axis 505 if having a fixed angle 511 in relation to the apex point 507 or support 901. It is thus possible to achieve a smooth and safe ascent of the staircase 501 without varying the position of the seat foundation 204. This is due to the level compensation of the first level compensation system wherein left and right frames 102, 103, pivot alternating according to the alternating contact with steps 502 by the offset wheel 107, 108, 111, 112, and wherein the base linkage 120 keeps the base plate 104 at a constant angle due to the symmetry of the CW and CCW rotations of the left and right frames 102, 103.

The staircase 501 has steps of constant dimensions 508, 509. The seat foundation 204 may in this case be at a fixed angle 511 in relation to the base plate 104 by a support 901, seen in FIG. 15*e-j*. As the angle 512 between support 901 or base plate 104 and the axis of inclination 505 is kept substantially constant in the ascent in FIG. 15*e-j*, the seat foundation 204 will also be kept at a substantially constant angle with respect to the same axis of inclination 505. In varying topography the angle of the seat foundation 204 may vary, which may be corrected by a second level compensation system, where the seat foundation 204 has a pivotable support 133 that may be displaced in space, as described further below. In the case of another staircase having other constant dimensions 508, 509, the offset 119, 120 may be adjusted by the frame control unit 125 and frame actuators 121, 122, 123, 124, such that a constant angle of the seat foundation is achieved once again during ascent, or descent.

The vehicle 100 may comprise a second level compensation system arranged for orientation of the seat foundation 204 in space to maintain a level plane of the seat foundation 204 in use of the vehicle 100. This provides for a smooth ride even when the transportation surface is very rough.

With reference to FIG. 6, which is a side view from the left of the vehicle in FIG. 1, showing details of the second level compensation system, the second level compensation system comprises in an embodiment a pivotable support 133 connecting the seat foundation 204 with the base plate 104 via upper and lower support pivot joints 304, and 305, respectively. Alternative means for providing a level plane of the seat foundation 204 may be used, such as the level compensation unit disclosed in patent application PCT/SE2009/051290, which is incorporated in its entirety herein. Advantages of having a pivotable support 133 is a more compact level compensation construction, the use of less components, and a quicker control.

FIGS. 5*a-c* show a detail of the vehicle 100 in FIG. 1. The second level compensation system may comprise a support control unit 134 connected to a level detection unit 136 that is adapted to provide levelling information to the support control unit 134. The second level compensation system further comprises at least one support actuator 135, 301 connected to the support control unit 134 and arranged to displace the pivotable support 133 according to the levelling information. FIGS. 5b-c show displacements of the seat foundation 204 to upper left and lower left positions, respectively. FIG. 6, which is a side view from the left of FIG. 5b, shows the displacement at an angle 306 from a vertical plane. FIG. 7 which is a view from the front of FIG. 5c, or from the left of FIG. 6, shows the displacement at an angle 307 from a vertical plane. Hence, the support 133 may be displaced in any direction to compensate for variations in inclination of the topography, such that the seat foundation can be moved to desired positions. The centre of gravity of the vehicle when supporting a load, for example when a person is positioned at the seat foundation, can be adjusted accordingly to avoid that the vehicle 100 falls over in any direction. For example, the support 133 may be tilted forwards in the driving direction when ascending up a staircase to avoid falling backwards.

The angles of the seat foundation, 308 and 309, with respect to a horizontal plane may be controlled according to embodiments described below.

The level detection unit 136 may be any unit capable of detecting level variations, e.g. angles of slope or tilt, elevation or inclination such as a gyroscope or inclinometer. According to FIG. 1, the level detection unit 136 may also receive information from the surface detection unit 126 over communication link 138. Information about the topography of the transport surface such as dimensional information, for example the dimensions of a stair case 501, may accordingly be used to automatically adjust the angles 306, 307 of the support 133 before the start of the ascent of the stair case 501. Likewise information of the current inclination of the vehicle may be sent from the level detection unit 136 over communication link 138 to the surface detection unit 126. The offset 119, 120 may accordingly be adjusted by the frame control unit 125 and frame actuators 121, 122, 123, 124 to comply with the current inclination. For example, for a terrain with steep slopes, the offset 119, 120 may be increased such that the distance between the frontmost wheel and rearmost wheel is increased whereby the centre of gravity can be maintained within the critical range and the vehicle 100 does not fall over.

In the current embodiments, the vehicle 100 comprises a first and second support actuator 135, 301 pivotably mounted to the base plate 104 at displaced first and second joints 302, 303, c.f. FIG. 5b. The support actuators 135, 301 are further pivotably mounted to the pivotable support at a third joint 304, c.f. FIG. 5b and FIG. 6. The base plate 104 extends in the rear direction such that an appropriate distance between the first and second joints 302, 303, and the third joint 304 is obtained. The third joint 304 may be a common joint for first and second support actuators 135, 301, such that the distance between the attachment point of the pivotable support 133 of the first support actuator 135 to the attachment point of the pivotable support 133 of the second support actuator 301 is as small as possible. This minimizes the momentum exerted by the first and second support actuators 135, 301 on the attachment point at the third joint 304 and a more durable construction is obtained. The payload of the seat foundation 204 is preferably carried by the pivotable support 133.

FIG. 6 shows an embodiment of a detail of the vehicle 100 from the left side of FIG. 1. FIG. 7 shows the same embodiment from the left of FIG. 6.

The seat foundation 204 may be connected to a seat actuator 305. As shown in FIG. 6 and FIG. 7, the seat actuator 305 is connected to the level detection unit 136 by communication link 310 and is arranged to displace the seat foundation 204 in accordance with the levelling information to maintain a level plane of the seat foundation 204. In FIGS. 6 and 7 the seat foundation is rotated at an angle, 308 and 309, respectively. The seat actuator 305 may be hydraulic, and/or electrical, and/or mechanical and may be fixed to the seat foundation 204 or the pivotable support 133. The upper support pivot joint 304 may allow movement of the seat foundation 204 in any direction.

FIG. 9 shows an embodiment of a detail of the vehicle 100 from the left side of FIG. 1. FIG. 10 shows the same embodiment from the left of FIG. 9.

The second level compensation system may comprise side struts 902, 903, pivotably connected to the seat foundation 204 and to the base plate 104 at either side of the pivotable support 133. The side struts 902, 903, are pivotably connected to the seat foundation 204 by upper strut pivot joints 904, 905, and pivotably connected to the base plate 104 by lower strut pivot joints 906, 907.

Figure 12:
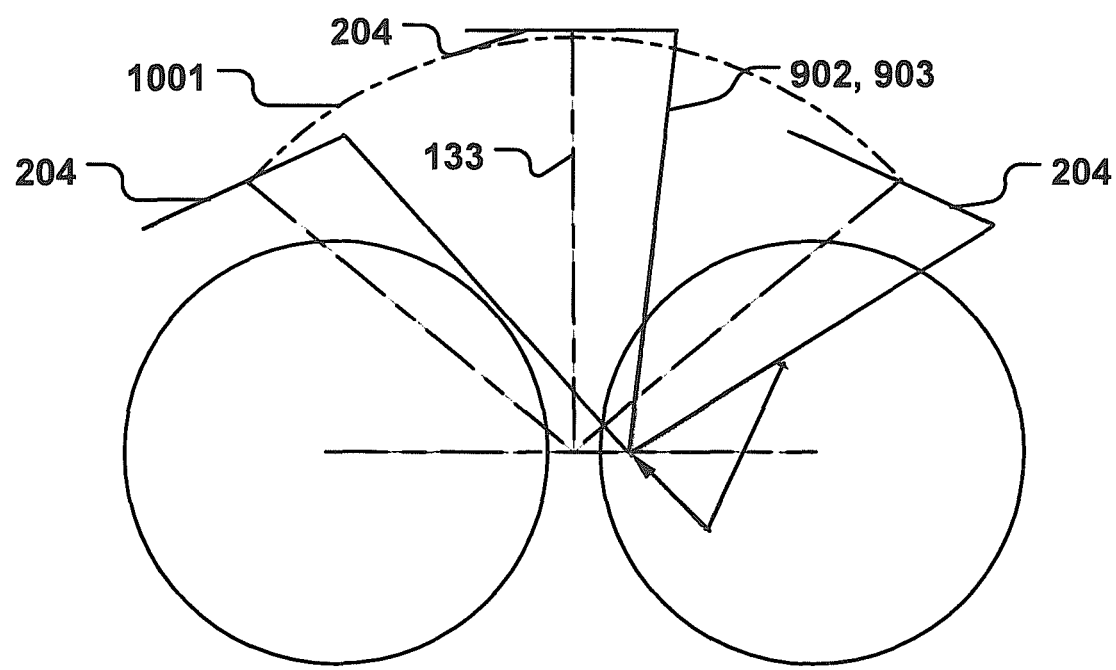
FIG. 12 is a schematic detail view from the left of the vehicle in FIG. 1.

FIG. 11 is a top view of FIG. 9 or 10 showing the seat foundation 204 as displaced in relation to base plate 104. The upper strut pivot joints 904, 905, and the upper support pivot joint 304 are arranged in a displaced triangular configuration 910, 911, at the seat foundation. Likewise the lower strut pivot joints 906, 907, and the lower support pivot joint 305 are arranged in a displaced triangular configuration at the base plate 104, with displacements 908, 909. the As seen in FIG. 9 and FIG. 10 the seat foundation 204 is kept at a level horizontal plane by the side struts 902, 903, as the pivotable support 133 is displaced with respect to a vertical axis 912. The length of the side struts 902, 903, and the displacements 908, 909, 910, 911 of strut pivot joints 904, 905, 906, 907, cause the seat foundation 204 to move in a level plane across a bow shaped path 1001, as seen in FIG. 12, showing a schematic illustration of movement of the pivotable support 133 with side struts 902, 903, from a side view of the vehicle 100. In the embodiment shown in FIG. 12 the angle of the seat foundation 204 with respect to a horizontal plane changes at the extreme left and right positions of the path 1001 due to the geometric configuration of the side struts 902, 903.

The side struts 902, 903 provides stabilization of the seat foundation 204 and can be configured by changing their geometrical properties, such as strut length, and placement of strut pivot joints 904, 905, 906, 907, to provide a desired path 1001 of travel of the seat foundation 204, and the range of angular displacement allowable for the seat foundation 204 when displaced by pivotable support 133. The triangular configuration 910, 911 may be particularly advantageous for providing stability, level compensation and support for the seat foundation 204 during movement of the pivotable support 133 across the bow shaped path 1001 in three dimensional space, thereby essentially describing a path of movement 1001 on the surface of an sphere.

Figure 13:
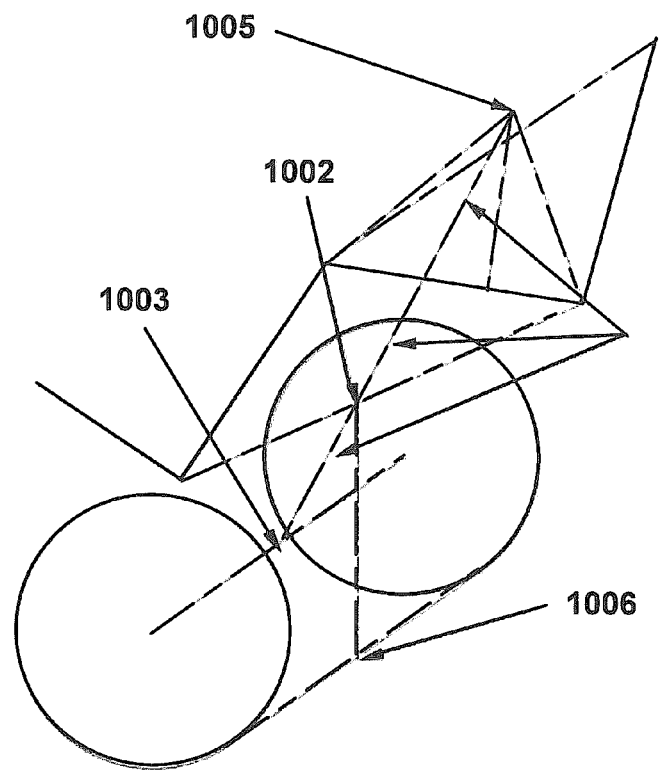
FIG. 13 is a schematic view of FIG. 13 showing vehicle mass centers for a sloping surface.
Figure 14:
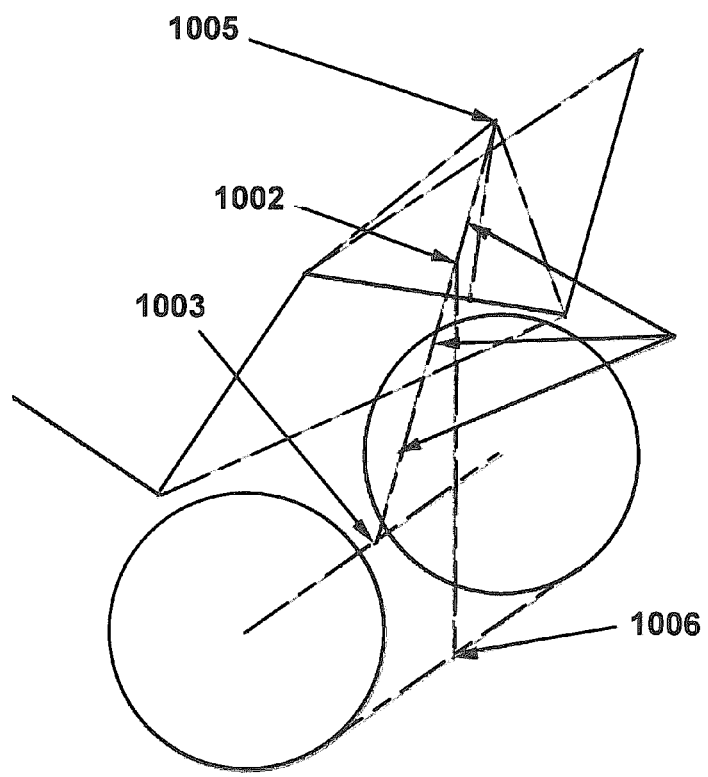
FIG. 14 is a schematic view of FIG. 13 showing vehicle mass centers for a different load for a sloping surface.

By configuring the side struts 902, 903, such that the path 1001 becomes substantially bow-shaped the position of the total mass centre can be easily adjusted. FIGS. 13 and 14 show the vehicle mass centre 1003, the passenger mass centre 1005, which result in a the total mass centre 1002. By the geometrical configuration of the side struts 902, 903, in the current embodiment the vertical axis from the total mass centre is placed in a central position 1006 between the wheels. This provides an even distribution of the weight on all of the wheels independent of the tilt of the vehicle 100, improving grip, traction and safety. FIGS. 13 and 14 show different positions of the total mass centre 1002. For example in FIG. 13 the weight of the passenger may be substantially half of the weight of the vehicle 100, and in FIG. 14 the weight of the passenger may be substantially double the weight of the vehicle 100.

The pivotable support 133 receives the load of the seat foundation 204 together with its payload, whereas the side struts 902, 903 are relieved from the load and function to control the path of movement and angle of the seat foundation 204 according to the above.

Figure 16A:
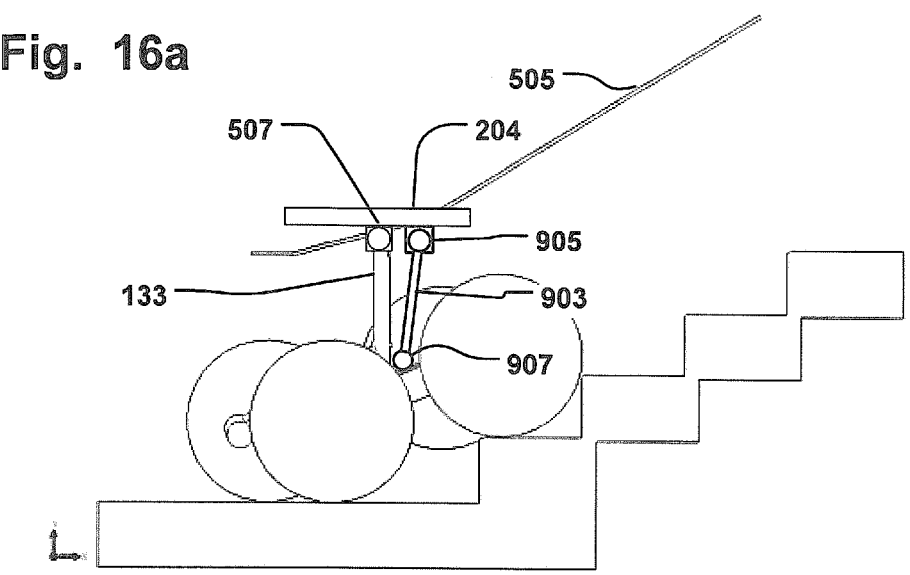
FIG. 16a-b are side and rear views of the vehicle in FIG. 1 when traversing a staircase according to another embodiment.
Figure 16B:
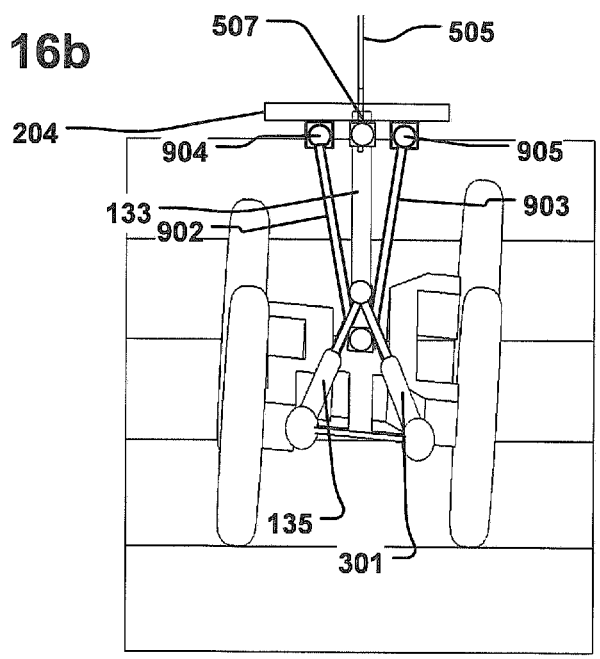

Returning to FIGS. 15a-d showing the vehicle 100 traversing staircase 501, the second level compensation of the second level compensation system is applied, also shown in method step 1203 in FIG. 18, to keep the seat foundation 204 at the desired position in the beginning of the ascent when surmounting the first step cause the vehicle 100 to tilt from side to side. In FIG. 15b the level detection unit 136 may detect that the vehicle tilts to the left and the pivotable support 133 may be displaced by support actuators 135, 305, to correct for the tilt angle such that the seat foundation 204 is kept on a level plane. In addition or alternatively, the seat actuator 305 and/or side struts 902, 903, tilts the seat foundation 204 such that a level plane is maintained. Correspondingly, in FIG. 15d the vehicle tilts to the right and support actuators 135 and 301, and/or seat actuator 305 may correct the level of the seat foundation 204. In FIGS. 15b and 15d the main correction of the level of the seat foundation 204 is done by adjusting the seat foundation angle 308, 309, by seat actuator 305, without displacing the support actuators 135, 301. FIG. 16a-b, which shows the same position of the vehicle 100 as FIG. 15c-d, the embodiment with side struts 902, 903, is shown. Here the support actuators 135, 301, displace the pivotable support 133 such that it is aligned in a vertical line. Simultaneously, the side struts 902, 903, keeps the seat foundation 204 at the desired angle, which may be substantially in a horizontal plane.

The support actuators 135 and 305, and/or seat actuator 305, may be locked at a pre-defined threshold value of swaying (e.g. calculated by level detection unit 136) in case certain unevenness is accepted. This may save energy as these actuators do not have to be operated. The side struts are however a passive mechanical level compensation and thereby energy saving from start.

In addition the support actuators 135 and 305 may displace the pivot support 133 in the forward direction to move the centre of gravity forward to improve stability of the vehicle 100, and thereby safety of the vehicle user.

In FIGS. 15a and 15c the support actuators 135, 305, seat actuator 305, and side struts 902, 903, respectively are not show.

FIGS. 15e-j show the embodiment of the vehicle 100 where a fixed support 901 joins the seat foundation 204 with the base plate 104, in order to show the sufficient level compensation of the first level compensation system to keep the seat foundation 204 at a constant angle when traversing a symmetric series of steps. Symmetric is to be construed as the steps having constant dimensions and that an initial surmounting of a first step or last step of a series of steps is completed. Further, the seat angle may be kept at a substantially constant angle also for a series of steps that have varying dimensions. In this case the offset 119, 120 may be adjusted during the ascent, for example by manual adjustment or automatic adjustment according to dimensional data in terrain memory 129 and data memory 137 of the vehicle 100.

The support actuators 135, 301, are not shown in FIG. 15e-j but may be used together with a pivotable support 133 in order to correct for the centre of gravity position.

In the embodiment in FIG. 1 the vehicle 100 has four wheels. The vehicle 100 may have a reduced or increased number of wheels.

The wheels 107, 108, 111, and 112 may each have a electric motor drive integrated into each wheel. This provides for a compact construction and the four wheel drive ensures good traction for each wheel. The wheels 107, 108, 111, and 112 may have ribbed tyres to enhance the grip on the transportation surface. Ribbed tyres may in particular be advantageous when climbing stairs as the stair edge provides a good mating surface for torque transfer and propulsion of the vehicle across the stair.

In embodiments the wheel diameter is preferably at least as large as the step height 509. The diameter of the wheels may be in the range 10-50 cm.

A number of methods are described below for traversing a stair case 501 with the vehicle 100. All methods may be applied to any type of stairs or any other obstacle, such as various back-country terrains.

Reference is made to overview of method steps in FIG. 18, steps 1200 of which are not necessarily performed in sequence and may not depend on each other, i.e. only a selection of the steps 1200 may be done, and flow diagrams in FIGS. 19, 20, 21, 23, 24, 25, and illustrations of vehicle configurations in FIG. 22a-f.

The wheel off-set 119, 120, may be adjusted continuously 1204 as the stair case 501 is traversed. The continuous adaptation provides for a smooth ride.

Adjusting said wheel off-set may comprise adjusting the distance between wheels 107, 108, of the left wheel pair, or wheel cluster in case of the vehicle 100 having a plurality of wheels, and/or adjusting the distance between wheels 111, 112 of the right wheel cluster.

At least one of the wheels may be braked 1205 simultaneous as at least one of the remainder of the wheels of the vehicle 100 traverse the stair case. The braked wheels provide for increased grip and stability as the climbing wheels traverse the stair case. The distance between the at least one braked wheel and the at least one wheel traversing the stair case is adjusted 1206, whereby simultaneous braking and traversing is achieved by respective wheels.

Three wheels may be braked simultaneous as at least one the remainder of the wheels traverse the stair case. Alternatively, two wheels are braked simultaneous as at least one remainder of said wheels traverse said stair case. Braking may be construed as locking the wheel such that it does not rotate. Any number of wheels may be locked while simultaneously climbing an obstacle with at least one wheel.

The distance between the wheels may be adjusted by means of wheel actuators 121, 122, 123, 124. An example with reference to FIG. 1 is that the wheels 107, 108, 111, are being braked with their respective axial distances 115, 116, 117, unchanged, and wheel 112 rotates at the same time as the frame actuator 124 increase or decrease axial distance 118. A further example is illustrated by method 1400 described below and seen in FIG. 19.

Adjusting the distance between the wheels may comprise positioning 1207 each wheel at an individual position by an associated actuator 121, 122, 123, 124, for each of the wheels. Optimal grip and traction can then be provided, while ensuring that the ride is comfortable as described further below by evening out the irregularities of the traversed surface.

At least one of the left and right frames 102, 103, may be expanded or contracted 1208 by the wheel actuators, thereby adjusting the distance between wheels of the left wheel cluster, and/or adjusting the distance between wheels of the right wheel cluster. The left and right frames 102, 103, can thereby be adjusted to a variety of conditions and allow independent movements of the wheels.

The wheels may be driven at different speeds 1209 and thereby adjusting the distance between wheels of the left wheel cluster by allowing expansion or contraction of the left frame, and/or adjusting the distance between wheels of the right wheel cluster allowing expansion or contraction of the right frame. This may be achieved by left and right frames allowing sliding movement in the longitudinal direction of the vehicle in which the wheels drive, for instance of the type shown in FIG. 17*a*-*b*. The wheels may be alternately braked to allow expansion or contraction of the frame by the sliding movement. Wheel actuators may be used in addition or as an alternative to this principle.

The action of braking of at least one of the wheels simultaneous as at least one of the remainder of the wheels traverse the stair case may be alternated 1210 for all wheels until the wheels have traversed a desired distance in the stair case. Performing the alternating action may comprise braking of at least one of the wheels at a first position until at least one of the remainder of the wheels has traversed a first distance in the stair case, 1211, and braking the at least one wheel having traversed the first distance at a second position until the at least one wheel at the first position has traversed a second distance in the stair case from the first position, 1212. Efficient climbing, or descent, is thereby achieved while having optimal grip.

During the aforementioned alternating action the distance between the at least one braked wheel and the at least one wheel traversing the stair case is adjusted 1213, according to above mentioned methods and means, whereby simultaneous braking and traversing is achieved by respective wheels.

Figure 19:
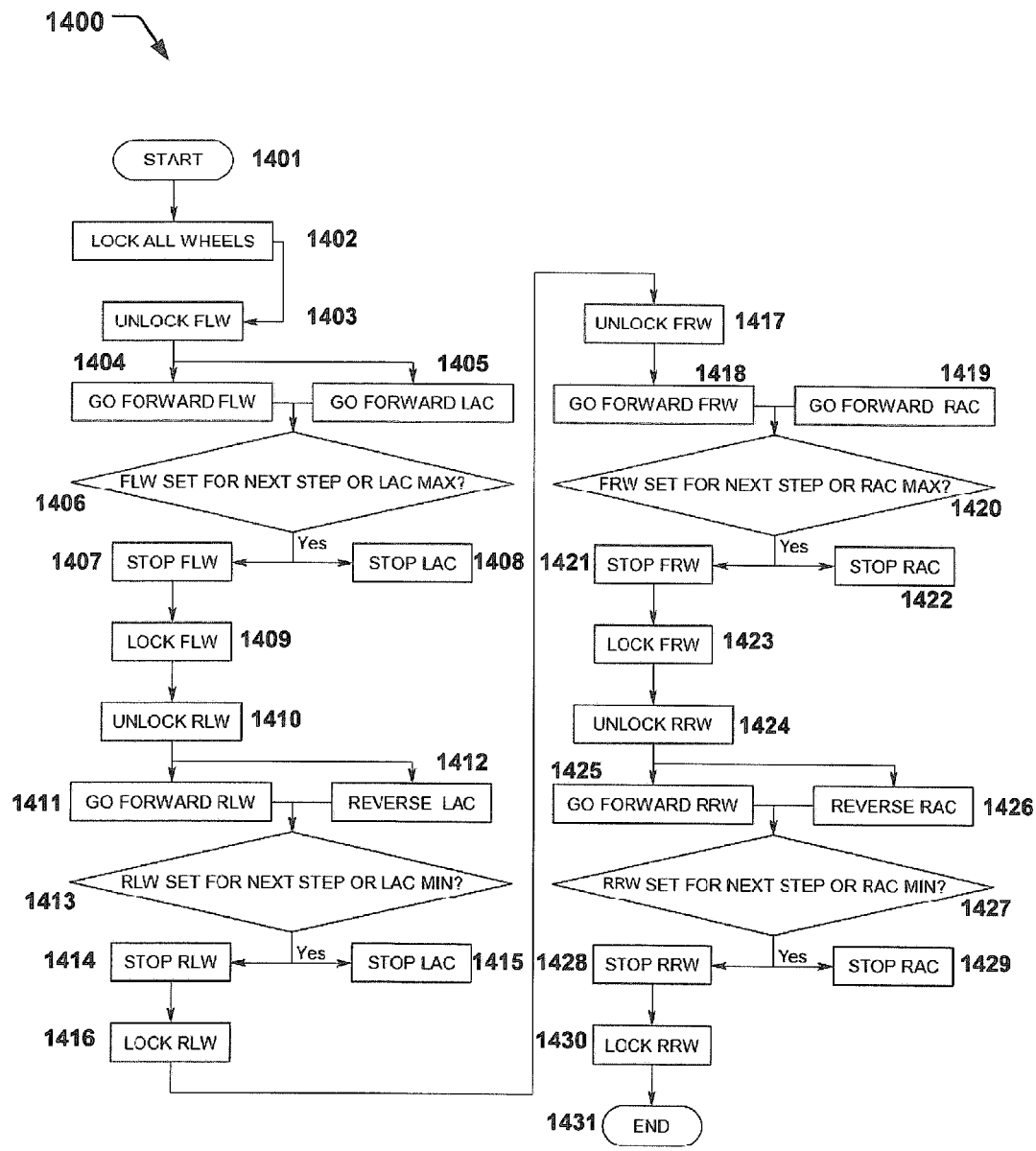
FIG. 19 illustrates a method according to an embodiment.

FIG. 19 illustrates a method 1400 of going forward in a staircase with a vehicle 100. The vehicle may go forward in both climbing and descending the staircase. The following abbreviations are used:

FLW=Forward left wheel;
RLW=Rear left wheel;
FRW=Forward right wheel;
RRW=Rear right wheel;
LAC=Left wheel actuator controlling distance between left wheels;
RAC=Right wheel actuator controlling distance between right wheels;
REV=Reverse/contract
GO=Go forward/expand
The method comprises the following steps;
1401 Start position;
1402 All wheels are locked;
1403 FLW is unlocked;
1404 FLW drives forward;
1405 LAC goes forward, expanding left frame so FLW may drive forward and the distance between FLW and RLW increases while RLW and the other wheels remain in locked/braked state. The speed of the LAC is set so that no sliding occurs for the FLW, as it may drive forward by an integrated motor in the wheel. The speed may be set according to a wheel-actuator relative speed algorithm;
1406 FLW has arrived at next step to climb or descend, e.g. in a stair case or the LAC has reached its maximum extension. The next step for the FLW may be detect by various sensors, that may detect when FLW has reached a new obstacle;
1407 If any of the conditions in 1406 are fulfilled FLW is stopped;
1408 The LAC is stopped as FLW is stopped;
1409 FLW is locked;
1410 RLW is unlocked;
1411 RLW drives forward;
1412 LAC is reversed and goes backward, thereby contracting left frame so RLW may drive forward and the distance between RLW and FLW decreases while FLW and the other wheels remain in locked/braked state;
1413 RLW has arrived at the next step or LAC has reached is minimal contracted length;
1414 RLW is stopped if any of the conditions in 1413 are fulfilled;
1415 The LAC is stopped as RLW is stopped;
1416 RLW is locked;
1417 FRW is unlocked;
1418 FRW drives forward;
1419 RAC goes forward, expanding right frame so FRW may drive forward and the distance between FRW and RRW increases while RRW and the other wheels remain in locked/braked state;
1420 FRW has arrived at next step to climb or descend, or RAC has reached its maximum extension;
1421 If any of the conditions in 1420 are fulfilled FRW is stopped;
1422 The RAC is stopped as FRW is stopped;
1423 FRW is locked;
1424 RRW is unlocked;
1425 RRW drives forward;
1426 RAC is reversed and goes backward, thereby contracting right frame so RRW may drive forward and the distance between RRW and FRW decreases while FRW and the other wheels remain in locked/braked state;
1427 RRW has arrived at the next step or RAC has reached is minimal contracted length;
1428 If any of the conditions in 1427 are fulfilled RRW is stopped;
1429 The RAC is stopped as RRW is stopped;
1430 RRW is locked;
1431 End. All wheels have climbed in sequence after each other, while the non-climbing wheels are braked. It is to be construed that the number of wheels may vary, without departing from this principle. The number of simultaneous climbing wheels may vary, and the number of simultaneous braked wheels may vary.

Figure 20:
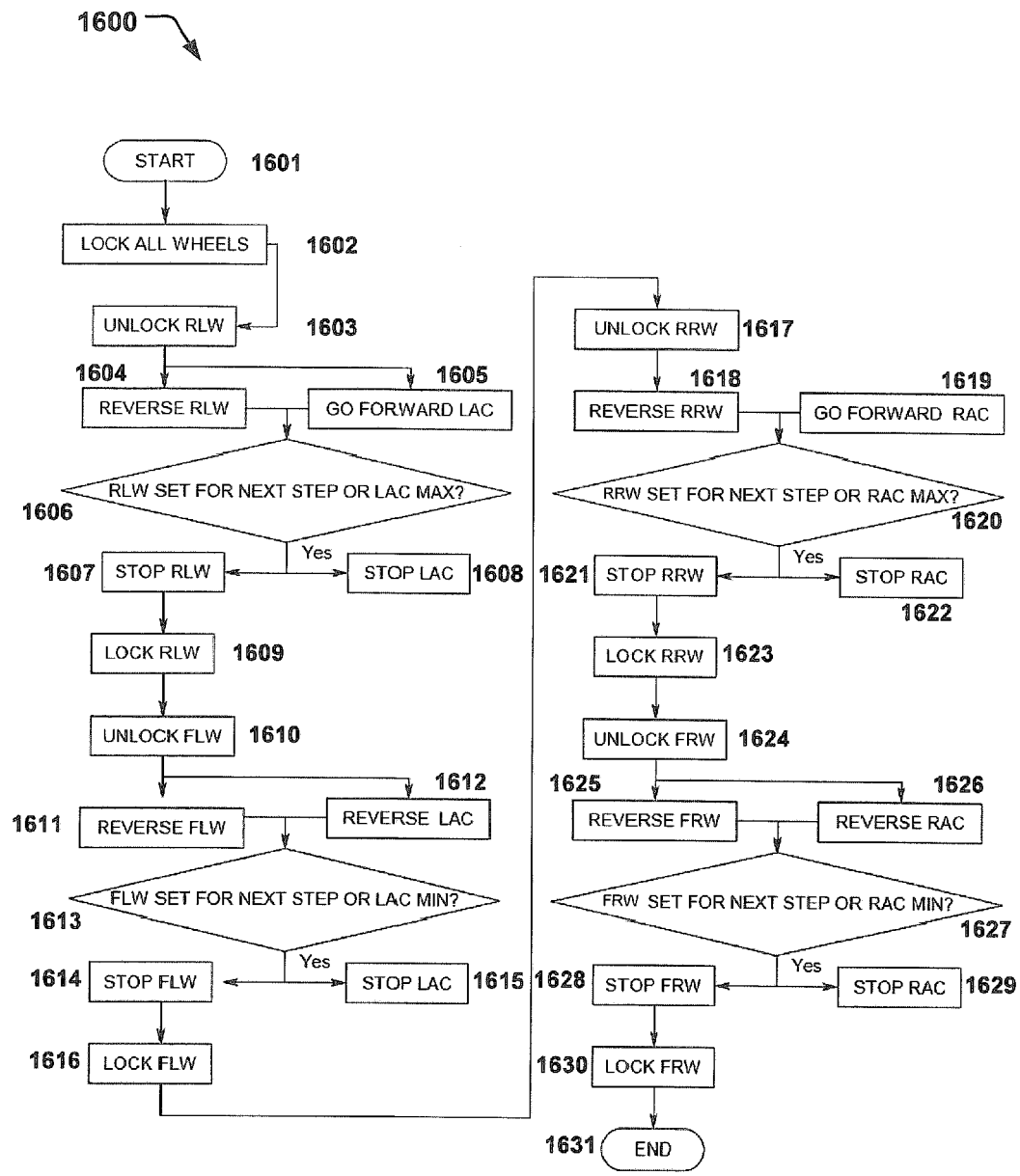
FIG. 20 illustrates a method according to an embodiment.

A method 1600 is illustrated in FIG. 20, corresponding to the method 1400 but the vehicle moves in the reverse direction, i.e. backing the vehicle, and the staircase may be climbed or descended backwards;
1601 Start position;
1602 All wheels are locked;
1603 RLW is unlocked;
1604 RLW drives in the reverse direction compared to the direction of driving in step 1404;
1605 LAC goes forward, expanding left frame so RLW may drive forward (in the reverse direction) and the distance between RLW and FLW increases while FLW and the other wheels remain in locked/braked state.
1606 RLW has arrived at next step, e.g. to climb or descend backwards, or the LAC has reached its maximum extension;
1607 If any of the conditions in 1606 are fulfilled RLW is stopped;
1608 The LAC is stopped as RLW is stopped;
1609 RLW is locked;
1610 FLW is unlocked;
1611 FLW drives in the reverse direction;
1612 LAC is reversed and goes backward, thereby contracting left frame so FLW may drive in the reverse direction and the distance between FLW and RLW decreases while RLW and the other wheels remain in locked/braked state;

1613 FLW has arrived at the next step or LAC has reached is minimal contracted length;
1614 FLW is stopped if any of the conditions in 1613 are fulfilled;
1615 The LAC is stopped as FLW is stopped;
1616 FLW is locked;
1617 RRW is unlocked;
1618 RRW drives in the reverse direction compared to the direction of driving in 1418;
1619 RAC goes forward, expanding right frame so RRW may drive in reverse and the distance between RRW and FRW increases while FRW and the other wheels remain in locked/braked state;
1620 RRW has arrived at next step to climb or descend backwards, or RAC has reached its maximum extension;
1621 If any of the conditions in 1620 are fulfilled RRW is stopped;
1622 The RAC is stopped as RRW is stopped;
1623 RRW is locked;
1624 FRW is unlocked;
1625 FRW drives in reverse;
1626 RAC is reversed and goes backward, thereby contracting right frame so FRW may drive in reverse and the distance between FRW and RRW decreases while FRW and the other wheels remain in locked/braked state;
1627 FRW has arrived at the next step or RAC has reached is minimal contracted length;
1628 If any of the conditions in 1627 are fulfilled FRW is stopped;
1629 The RAC is stopped as FRW is stopped;
1630 FRW is locked;
1631 End.

Figure 21:
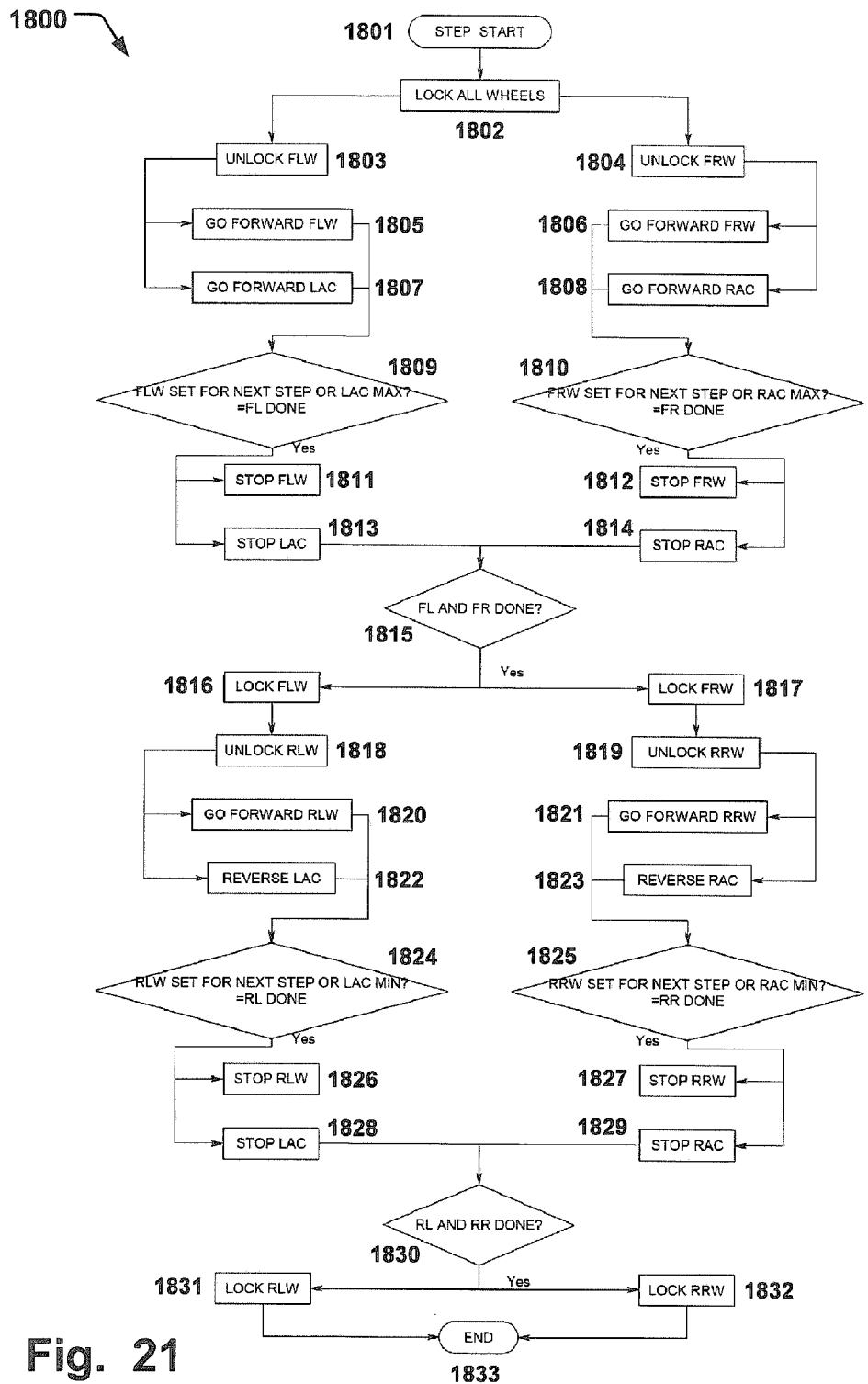
FIG. 21 illustrates a method according to an embodiment.

Method 1800 in FIG. 21 illustrates the case of having two braked wheels while two wheels climb simultaneously and comprises the steps:
1801 Start position;
1802 All wheels are locked;
1803 FLW is unlocked;
1804 FRW is unlocked;
1805 FLW drives forward;
1806 FRW drives forward simultaneously as FLW;
1807 LAC goes forward, expanding left frame so FLW may drive forward and the distance between FLW and RLW increases while RLW and RRW remain in locked/braked state;
1808 RAC goes forward, expanding right frame so FRW may drive forward and the distance between FRW and RRW increases while RRW and RLW remain in locked/braked state;
1809 FLW has arrived at next step to climb or descend, or the LAC has reached its maximum extension;
1810 FRW has arrived at next step to climb or descend, or the RAC has reached its maximum extension;
1811 If any of the conditions in 1809 are fulfilled FLW is stopped;
1812 If any of the conditions in 1810 are fulfilled FRW is stopped;
1813 LAC is stopped as FLW is stopped;
1814 RAC is stopped as FRW is stopped;
1815 Check if conditions in 1809 and 1810 are fulfilled;
1816 FLW is locked;
1817 FRW is locked;
1818 RLW is unlocked;
1819 RRW is unlocked;
1820 RLW drives forward;
1821 RRW drives forward simultaneously as RLW;
1822 LAC is reversed and goes backward, thereby contracting left frame so RLW may drive forward and the distance between RLW and FRW decreases while FRW and FLW remain in locked/braked state;
1823 RAC is reversed and goes backward, thereby contracting right frame so RRW may drive forward and the distance between RRW and FRW decreases while FRW and FLW remain in locked/braked state;
1824 RLW has arrived at next step to climb or descend, or the LAC has reached minimal contracted length;
1825 RRW has arrived at next step to climb or descend, or the RAC has reached its minimal contracted length;
1826 If any of the conditions in 1824 are fulfilled RLW is stopped;
1827 If any of the conditions in 1825 are fulfilled RRW is stopped;
1828 LAC is stopped as RLW is stopped;
1829 RAC is stopped as RRW is stopped;
1830 Check if conditions in 1824 and 1825 are fulfilled;
1831 RLW is locked;
1832 RRW is locked;
1833 End.

By sensing the conditions actuator max out, actuator max in, and wheel set for next step (reached the next step and ready to climb or descend) a decision can be extracted to decide if the staircase have only one step or the staircase top is reached. The decision is extracted for the forward wheels first then the rear wheels. The process also adjusts the vehicle to current step whether the step length and step height differs or if the vehicle is climbing non-perpendicular to the staircase or of the staircase is turning in any direction.

The order of lock, brake or drive of one, two or three wheels and climbing with one, two or three wheels can be any order, and can also vary from step to step or from stairway to stairway.

The order of leaving one, two or three wheels unbraked/unlocked, or to drive those wheels at any different speed from or similar speed to, or constant speed or variable speed in relation to, any of the climbing wheel(s) in any direction, and climbing with one, two or three wheels can be any order, and can also vary from step to step or from stairway to stairway. The direction of the vehicle may be climbing or descending since the principle of the vehicle going forward or reversing works when climbing as well as descending stairs.

The vehicle 100 may have a payload at a payload centre 2001 of the vehicle, seen in FIG. 22*a-f*. The payload centre 2001 may correspond substantially to the centre weight point of the vehicle 100. The payload centre 2001 may correspond to a point connected to a driver seat. The position of the payload centre 2001 may be shifted 1214 in relation to at least one braked wheel of the vehicle. This may be done while braking at least one of the wheels simultaneous as at least one of the remainder of the wheels traverse the stair case. The procedure is illustrated in FIG. 22*a-f*, described in greater detail below. By shifting the payload centre in relation to a braked wheel, and/or shifting the payload centre in relation to a wheel traversing the staircase the payload centre is adjusted independently of the wheels, and the movement produced by the wheels are not directly translated to the payload centre point, which thereby allows for evening out rapid or sudden movements, and/or positioning of the weight point centre so that optimal balance is achieved while traversing an obstacle. This provides a more comfortable and safe traversing movement of the vehicle.

FIG. 22*a* shows the vehicle 100 from above at starting position indicated by line 2002 at rear wheels 108 (RLW), 112 (RRW). The finishing position is indicated by FIG. 22*f* by line 2012, as the vehicle 100 has traversed a distance, e.g. in a staircase. In FIG. 22b the left front wheel 107 (FLW) has traversed a first distance 2003 in relation to the other wheels, 111 (FRW), 108 (RLW), 112 (RRW) remaining in braked position, as explained above in relation to methods 1200, 1400, 1600, 1800. In FIG. 22c the payload centre 2001 has shifted a first payload centre distance 2004 in relation to the previous position in FIG. 22b. Also the position of the wheels has not changed in FIG. 22c in relation to the previous position in FIG. 22b. The payload centre 2001 may thus be positioned independently from the wheels with advantages described above.

The payload centre may be shifted by the wheel actuators 121, 122, 123, 124, as illustrated in FIG. 22a-f. With reference to previously described methods 1200, 1400, 1600, 1800, the left wheel actuator controlling distance between left wheels (LAC) corresponds to 121 or 122, and right wheel actuator controlling distance between right wheels (RAC) corresponds to 123 or 124. The following denotations will also be used, particular in relation to methods 3000, 4000, in FIGS. 23-24;

FLAC=Forward left actuator
FRAC=Forward right actuator
RLAC=Rear left actuator
RRAC=Rear right actuator The payload centre may be shifted by other means such as other actuators connected to the frame of the vehicle and the position of the payload. Integrating the movement of the payload centre 2001 with the traversing movement of the wheels via the wheel actuators provides however a continuous fluent motion of the vehicle, and a comfortable and safe motion. Also a compact and light vehicle 100 is obtained.

The payload centre 2001 may be shifted 1215 as a function of, or dependent on, a change in distance between the at least one braked wheel and the at least one wheel traversing the stair case. Hence, the length of the first payload centre distance 2004 may depend on the first traversed distance 2003 by which the left front wheel 107 has moved in relation to the other wheels, 111, 108, 112 remaining in braked position. The dependency may be set according to an algorithm optimizing the speed and range of motion of the payload centre 2001 in relation to the wheels. This principle can be applied to vehicles having any number of wheels, such as 2, 3, 4, 5, 6, or more. Thus, a method of traversing a staircase may comprise traversing a first distance in the staircase with at least one wheel in a first traversing movement, and shifting the payload centre as a function, and/or by a fraction, of the first distance in a first payload centre movement. The fraction can be set so that the payload centre 2001 has returned to its original position in relation to the wheels as each of the wheels has traversed the staircase by a first distance, which is further possible due to the wheel actuators adjusting the payload centre position. This is illustrated in FIG. 22f, where the distance between the payload centre 2001 in relation to the wheels is the same as in FIG. 22a. This is also illustrated in detail by FIGS. 23-24, describing methods 3000, 4000.

The first traversing movement in FIG. 22b by wheel 107 and the first payload centre movement in FIG. 22c may be performed simultaneously. Hence, for every increment in distance by the climbing wheel in the first traversing movement, the wheel actuators will shift the distance of the payload centre 2001 in real-time according to a function of aforementioned increment. FIGS. 22a-c illustrate said movements separately for sake of clarity. This provides for an efficient fluid motion and removal of any sudden accelerations or retardations. The first traversing movement and the first payload centre movement may be substantially in the same direction as illustrated in FIG. 22a-f. The directions may be different in other configurations of the vehicle 100.

The first traversing movement is performed by expanding or contracting at least one of the left and right frames. In FIG. 22b the left frame 102 is expanded. The expansion in this case is performed by expanding the forward left actuator 121 (FLAC), whereby the FLW arrives at distance 2003. Simultaneously, or in sequence, the distance between the payload centre 2001 and each of the wheels is adjusted by the associated wheel actuators 121, 122, 123, 124, for providing the first payload centre movement. This is illustrated in FIG. 22c, as forward left actuator (FLAC) 121, and forward right actuator (FRAC) 123 contract and pull payload centre 2001 to the left in the figure, and rear left actuator (RLAC) 122, and rear right actuator (RRAC) 124 expand and push payload centre 2001 to the left in the figure, while having the wheels braked. If the movements are performed simultaneously, i.e. FLW traverse forward, FLAC will in realtime adjusts is position, during which the other wheels are braked, so that the payload centre move forward by distance 2004 while FLW traverse forward by distance 2003 in relation to its starting position or the braked wheels. FIG. 22c indicates that the distance moved by the wheel actuators corresponds to the distance 2004 moved by the payload centre, but deviations may occur without departing from the described principle of the traversing movement and the payload centre movement.

FIG. 22d-f the intermediate steps between the traversing movement of the remainder of the wheels and the corresponding payload centre movements have been omitted and the movements are illustrated together. Hence, in FIG. 22d RLW has traversed forward in a second traversing movement by a second traversing distance 2005, which could be different or the same as the first traversing distance 2003. The payload centre 2001 has also moved forward by a second payload centre distance 2006, again by adjusting the associated wheel actuators. Hence, FLAC and FRAC has contracted, and RRAC expanded. RLAC has in total contracted due to the traversing movement by RLW. FRW, FLW, and RRW has remained braked. A different number of wheels may traverse or be braked simultaneously, as describe in preceding methods.

Hence a method of traversing a stair case may comprise a second traversing movement 1216 by at least one wheel being braked during the first traversing movement by a second distance, and shifting 1217 the payload centre by a fraction of the second distance in a second payload centre movement, and further repeating 1218 the first and second traversing movement until the wheels have traversed a desired distance in the stair case. This is illustrated by the difference 2007 between the start position 2002 and the finish position 2012 in FIG. 22f. In this example the difference 2007 may be substantially the same as the traversing distances 2003, 2005, 2008, and 2010.

Returning to FIG. 22e, FRW has traversed forward distance 2008, while payload centre has been moved forward distance 2009, which again can be a function, or fraction, of the distance 2008. In FIG. 22f, RRW has traversed forward distance 2010, while payload centre has been moved forward distance 2011, and the finish position is reached. The sequence may be repeated until the obstacle or staircase is traversed.

In the above example the vehicle comprised four wheels, which may be different, and the fraction moved by the payload centre in relation to a first traversed distance may be a third of the first distance, or a fourth of the first distance.

The position of the payload centre 2010 may be shifted 1219 with an offset value (WP shift) for adjusting the centre weight point of the vehicle. In the methods 3000, 4000, illustrated in FIGS. 23-24, and FIG. 22a-f there is an interaction between the actuators in order to position and center the payload in reference to the vehicle. In the methods 3000, 4000 there may be added in the process a sub routine called WP shift, a Weight Point constant or offset value in order to acquire desired weight point displacement.

Figure 23:
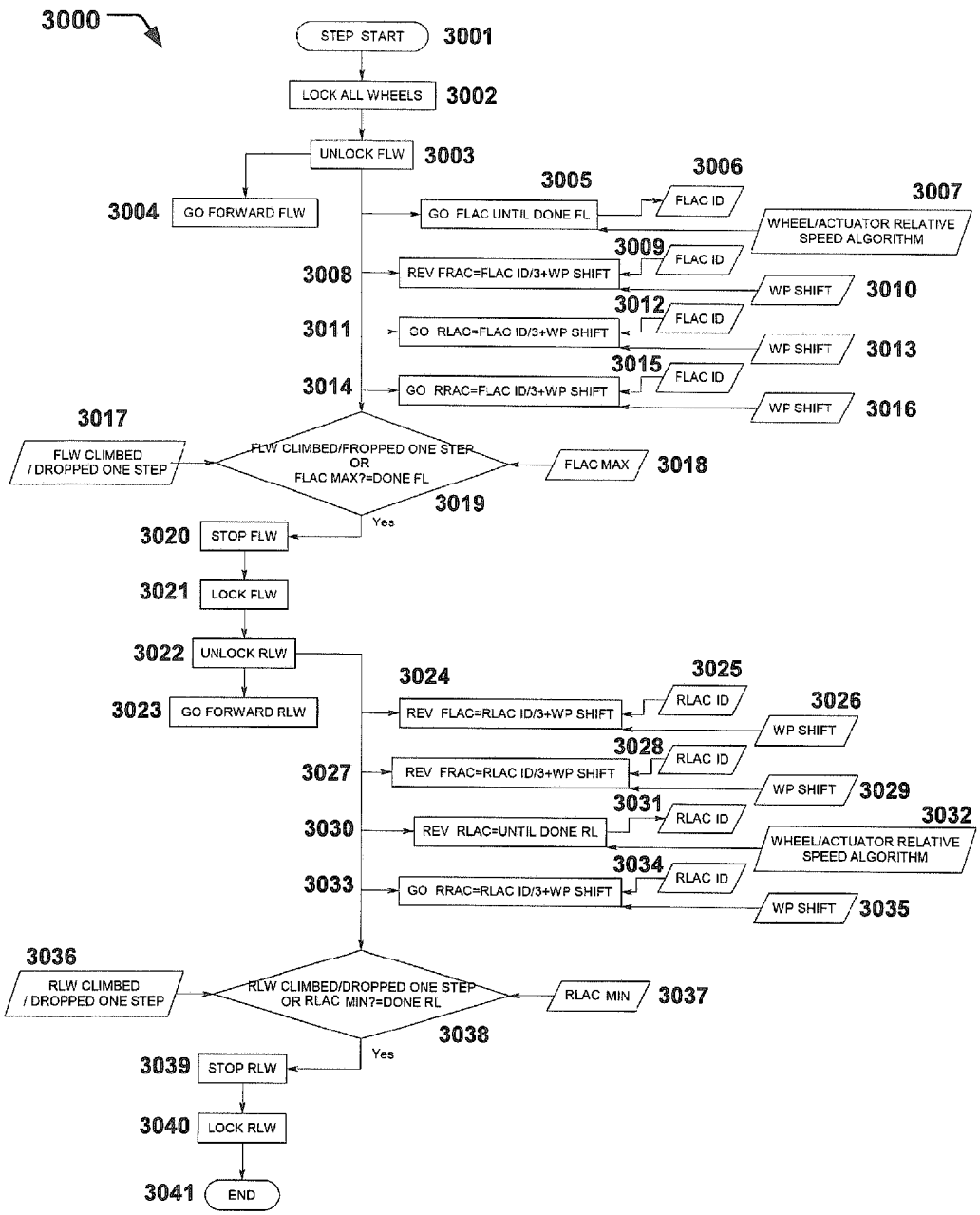
FIG. 23 illustrates a method according to an embodiment.

FIG. 23 illustrates a method 3000 for traversing a staircase according to the principle described in FIG. 22a-f. The method 3000 may be implemented as a subroutine to the method 1400 in FIG. 19, and the method 1600 in FIG. 20. The following abbreviations are used:

FLAC=Forward left actuator
FRAC=Forward right actuator
RLAC=Rear left actuator
RRAC=Rear right actuator
WP shift=desired weight point shift within vehicle
ID=Increment distance
REV=Reverse/contract
GO=Go forward/expand
3001 Start position;
3002 All wheels are locked/braked;
3003 FLW is unlocked;
3004 FLW drives forward;
3005 FLAC extends until the condition in 3019 is fulfilled: FLW has arrived at next step or FLAC has reached its maximum extension;
3006 Until 3019 is fulfilled FLAC expands by a plurality of incremental distances;
3007 Wheel/actuator relative speed algorithm ensuring that no sliding of the wheels occur;
3008 FRAC is reversed, i.e. contracted, with a fraction of the incremental distance 3006, here by a third of the incremental distance 3006, and taking any weight point shift 3010 into account;
3009 Incremental distance 3006 is input to step 3008;
3010 Weight point shift/offset for adjusting the weight point by an arbitrary factor;
3011 RLAC is expanded with a fraction of the incremental distance 3006, here by a third of the incremental distance 3006, and taking any weight point shift 3013 into account;
3012 Incremental distance 3006 is input to step 3011;
3013 Weight point shift for adjusting the weight point by an arbitrary factor;
3014 RRAC is expanded with a fraction of the incremental distance 3006, here by a third of the incremental distance 3006, and taking any weight point shift 3016 into account;
3015 Incremental distance 3006 is input to step 3014;
3016 Weight point shift/offset for adjusting the weight point by an arbitrary factor;
3017 FLW has arrived at next step to climb/descend;
3018 FLAC has reached its maximum extension;
3019 Any of conditions in 3017 and 3018 fulfilled;
3020 Stop FLW
3021 Lock FLW
3022 RLW is unlocked;
3023 RLW drives forward;
3024 FLAC is reversed, i.e. contracted, with a fraction of the incremental distance 3031, here by a third of the incremental distance 3031, and taking any weight point shift 3026 into account;
3025 Incremental distance 3031 is input to step 3024;
3026 Weight point shift for adjusting the weight point by an arbitrary factor;
3027 FRAC is reversed, i.e. contracted, with a fraction of the incremental distance 3031, here by a third of the incremental distance 3031, and taking any weight point shift 3029 into account;
3028 Incremental distance 3031 is input to step 3027;
3029 Weight point shift/offset for adjusting the weight point by an arbitrary factor;
3030 RLAC contracts until the condition in 3038 is fulfilled: RLW has arrived at next step or RLAC has reached its minimum contraction;
3031 Until 3038 is fulfilled RLAC contracts by a plurality of incremental distances;
3032 Wheel/actuator relative speed algorithm ensuring that no sliding of the wheels occur;
3033 RRAC is expanded with a fraction of the incremental distance 3031, here by a third of the incremental distance 3031, and taking any weight point shift 3035 into account;
3034 Incremental distance 3031 is input to step 3033;
3035 Weight point shift/offset for adjusting the weight point by an arbitrary factor;
3036 RLW has arrived at next step to climb/descend;
3037 RLAC has reached its minimum contraction;
3038 Any of conditions in 3036 and 3037 fulfilled;
3039 Stop RLW
3040 Lock RLW
3031 End.

Figure 24:
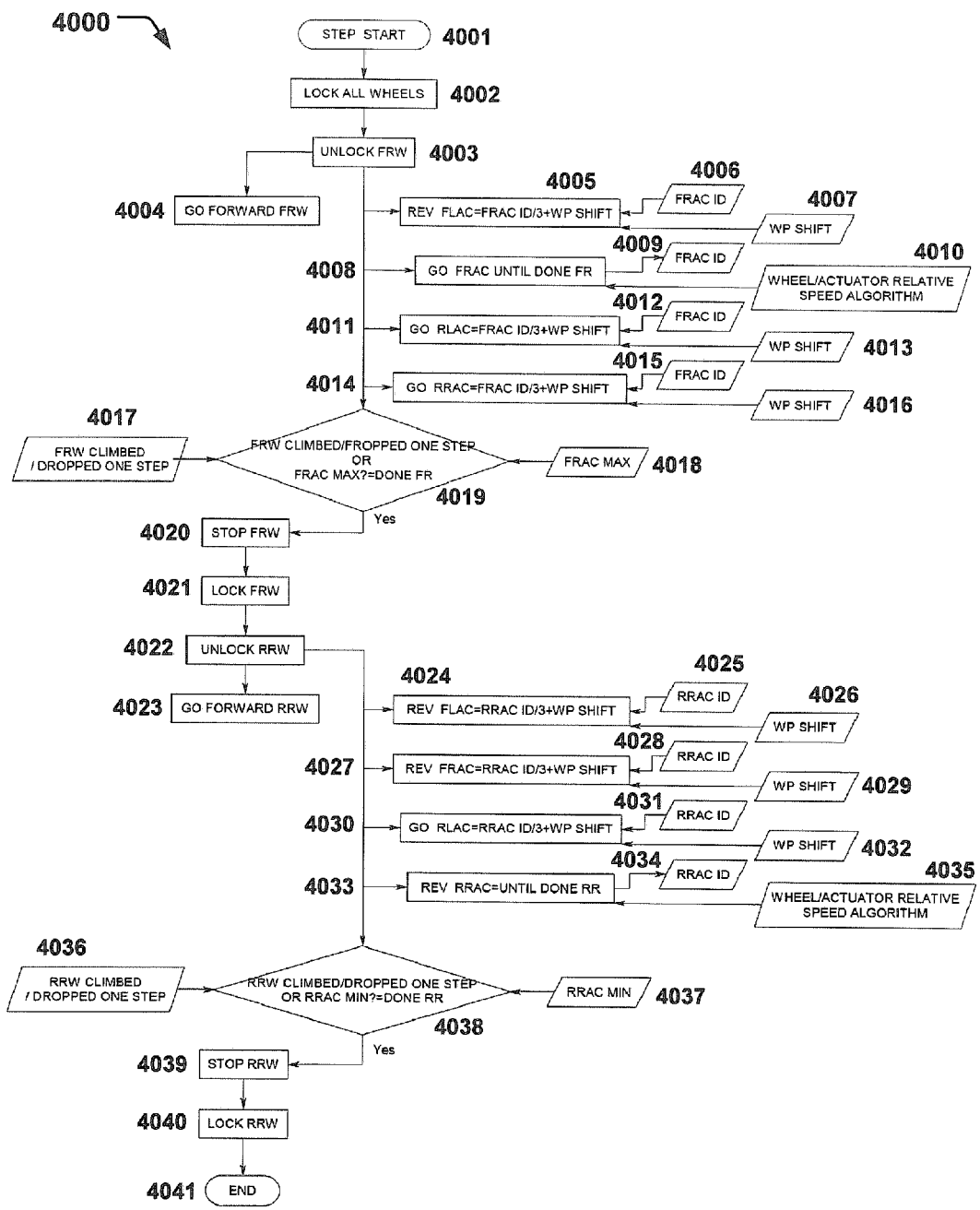
FIG. 24 illustrates a method according to an embodiment.

FIG. 24 illustrates method 4000 for traversing a staircase, corresponding to method 3000, but describing movement with left wheel pair. The method 4000 may be implemented as a subroutine to the method 1400 in FIG. 19, and the method 1600 in FIG. 20.

4001 Start position;
4002 All wheels are locked/braked;
4003 FRW is unlocked;
4004 FRW drives forward;
4005 FLAC is reversed, i.e. contracted, with a fraction of the incremental distance 4009, here by a third of the incremental distance 4009, and taking any weight point shift 4007 into account;
4006 Incremental distance 4009 is input to step 4005;
4007 Weight point shift/offset for adjusting the weight point by an arbitrary factor;
4008 FRAC extends until the condition in 4019 is fulfilled: FRW has arrived at next step or FRAC has reached its maximum extension;
4009 Until 4019 is fulfilled FRAC expands by a plurality of incremental distances;
4010 Wheel/actuator relative speed algorithm ensuring that no sliding of the wheels occur;
4011 RLAC is expanded with a fraction of the incremental distance 4009, here by a third of the incremental distance 4009, and taking any weight point shift 4013 into account;
4012 Incremental distance 4009 is input to step 4011;
4013 Weight point shift for adjusting the weight point by an arbitrary factor;
4014 RRAC is expanded with a fraction of the incremental distance 4009, here by a third of the incremental distance 4009, and taking any weight point shift 4016 into account;
4015 Incremental distance 4009 is input to step 4014;
4016 Weight point shift for adjusting the weight point by an arbitrary factor;
4017 FRW has arrived at next step to climb/descend;
4018 FRAC has reached its maximum extension;
4019 Any of conditions in 4017 and 4018 fulfilled;
4020 Stop FRW
4021 Lock FRW
4022 RRW is unlocked;

4023 RRW drives forward;
4024 FLAC is reversed, i.e. contracted, with a fraction of the incremental distance 4034, here by a third of the incremental distance 4034, and taking any weight point shift 4026 into account;
4025 Incremental distance 4034 is input to step 4024;
4026 Weight point shift for adjusting the weight point by an arbitrary factor;
4027 FRAC is reversed, i.e. contracted, with a fraction of the incremental distance 4034, here by a third of the incremental distance 4034, and taking any weight point shift 4029 into account;
4028 Incremental distance 4034 is input to step 4027;
4029 Weight point shift for adjusting the weight point by an arbitrary factor;
4030 RLAC is expanded with a fraction of the incremental distance 4034, here by a third of the incremental distance 4034, and taking any weight point shift 4032 into account;
4031 Incremental distance 4034 is input to step 4030;
4032 Weight point shift/offset for adjusting the weight point by an arbitrary factor;
4033 RRAC contracts until the condition in 4038 is fulfilled: RRW has arrived at next step or RRAC has reached its minimum contraction;
4034 Until 4038 is fulfilled RRAC contracts by a plurality of incremental distances;
4035 Wheel/actuator relative speed algorithm ensuring that no sliding of the wheels occur;
4036 RRW has arrived at next step to climb/descend;
4037 RRAC has reached its minimum contraction;
4038 Any of conditions in 4036 and 4037 fulfilled;
4039 Stop RRW
4040 Lock RRW
4031 End.

Figure 25:
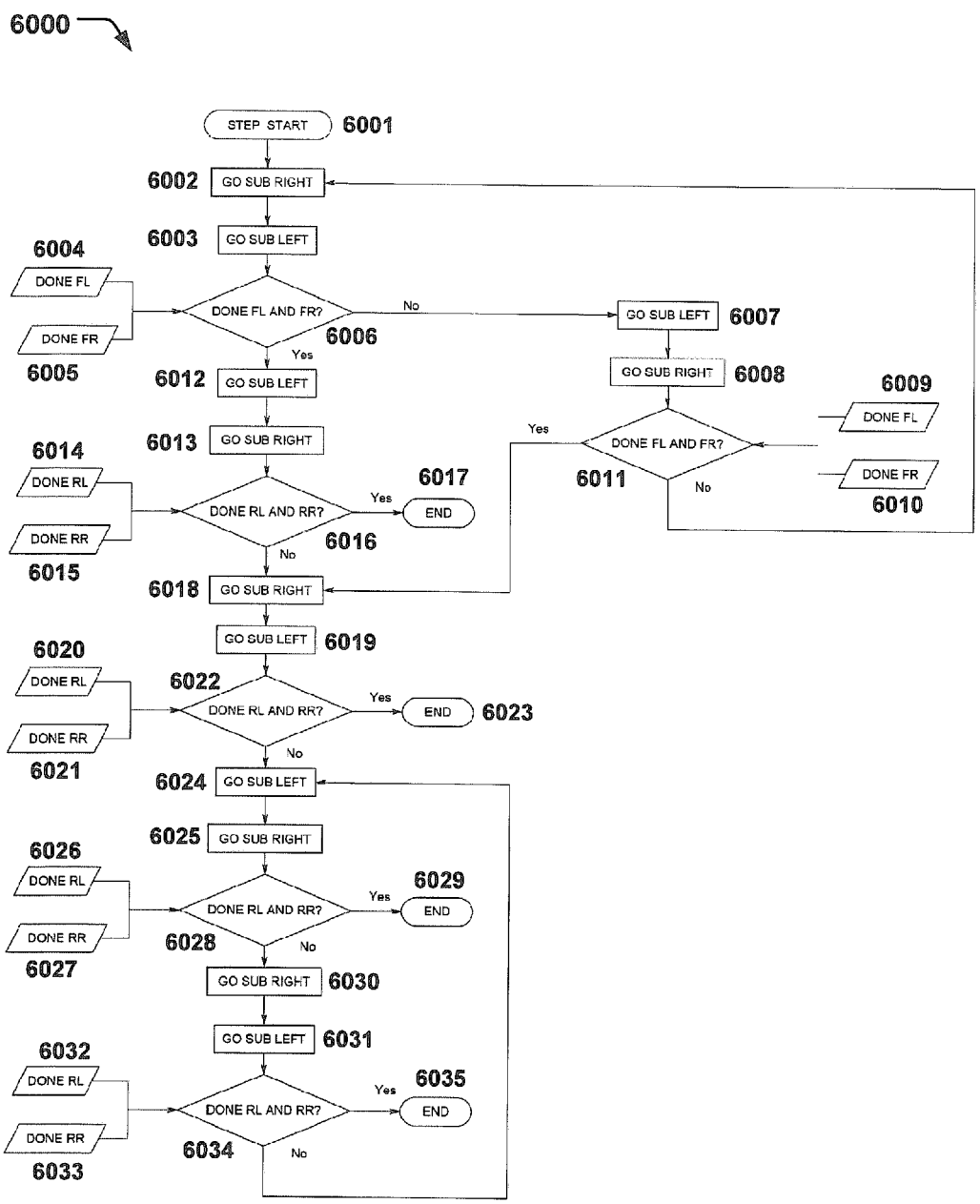
FIG. 25 illustrates a method according to an embodiment.

FIG. 25 illustrates a method 6000 where the left and right wheel pair move in an alternating action. The method 6000 describes how rear and front wheels alternately climbs in a constant loop while a condition is asked for, i.e. when both front wheels have reached the top of the stairs. When that condition is fulfilled the loop continues and next condition is asked if both rear wheels have reached the top of the stairs, where the loop ends.

6001 Start position;
6002 Right wheel pair moves forward according to method 3000;
6003 Left wheel pair moves forward according to method 4000;
6004 Condition; done FL generated, i.e. condition 3019 in FIG. 23 fulfilled;
6005 Condition; done FR generated, i.e. condition 4019 in FIG. 24 fulfilled;
6006 Any of 6004 and 6005 completed;
6007 If no in 6006, move left wheel pair;
6008 If no in 6006, move right wheel pair;
6009 Condition; done FL generated, i.e. condition 3019 in FIG. 23 fulfilled;
6010 Condition; done FR generated, i.e. condition 4019 in FIG. 24 fulfilled
6011 Check again if any of 6009 and 6010 completed; If no return to 6002; if yes go to 6018;
6012 If yes in 6006, move left wheel pair;
6013 If yes in 6006, move right wheel pair;
6014 Condition; done RL generated, i.e. condition 3038 in FIG. 23 fulfilled;
6015 Condition; done RR generated, i.e. condition 4038 in FIG. 24 fulfilled;
6016 Any of 6014 and 6015 completed;
6017 If yes in 6016, end;
6018 If no in 6016, move right wheel pair;
6019 If no in 6016, move left wheel pair;
6020 Condition; done RL generated, i.e. condition 3038 in FIG. 23 fulfilled;
6021 Condition; done RR generated, i.e. condition 4038 in FIG. 24 fulfilled;
6022 Any of 6020 and 6021 completed;
6023 If yes in 6022, end;
6024 If no in 6022, move left wheel pair;
6025 If no in 6022, move right wheel pair;
6026 Condition; done RL generated, i.e. condition 3038 in FIG. 23 fulfilled;
6027 Condition; done RR generated, i.e. condition 4038 in FIG. 24 fulfilled;
6028 Any of 6026 and 6027 completed;
6029 If yes in 6028, end;
6030 If no in 6028, move right wheel pair;
6031 If no in 6028, move left wheel pair;
6032 Condition; done RL generated, i.e. condition 3038 in FIG. 23 fulfilled;
6033 Condition; done RR generated, i.e. condition 4038 in FIG. 24 fulfilled;
6034 Any of 6032 and 6033 completed;
6035 If yes in 6034, end;
6036 If no in 6034, goto 6024;

As will be appreciated by one of skill in the art, the present invention may be embodied as device, system, or method.

The present invention has been described above with reference to specific embodiments. However, other embodiments than the above described are equally possible within the scope of the invention. Different method steps than those described above, may be provided within the scope of the invention. The different features and steps of the invention may be combined in other combinations than those described. The scope of the invention is only limited by the appended patent claims.

The invention claimed is:

1. A vehicle having a multiple of level compensation systems, said vehicle comprising:
a chassis having a left frame, a right frame and a base plate,
a first level compensation system comprising a pivot joint for pivotably connecting said left and right frames to said base plate, whereby said left and right frames are rotatable with respect to each other around a common rotational axis, wherein said left and right frame extends in a direction perpendicular to said rotational axis,
a left wheel pair comprising a left front wheel and a left rear wheel, the left front wheel and left rear wheels having left rotation axes and being mounted in opposite ends of said left frame,
a right wheel pair comprising a right front wheel and a right rear wheel, the right front wheel and right rear wheels having right rotation axes and being mounted in opposite ends of said right frame,
wherein at least one first axial distance from a left rotation axis of said left wheel pair to said rotational axis is different from at least one second axial distance from a right rotation axis of said right wheel pair to said rotational axis, such that said left and right wheel pair have at least one off-set to each other, comprising at least one wheel displacement unit arranged to displace at least one of said left front wheel and left rear wheel in relation to at least one of said right front wheel and right rear wheel to provide said off-set
a frame control unit adapted to provide off-set values, wherein said at least one wheel displacement unit comprises left frame actuators and right frame actuators, wherein the left and right frame actuators are connected to said frame control unit, wherein said left frame actuators are arranged to adjust one of said first axial distances by displacement of said wheels of said left wheel pair relative to each other, and wherein said right frame actuators are arranged to adjust one of said second axial distances by displacement of said wheels of said right wheel pair relative to each other, and wherein said displacements are based on said off-set values to provide said off-set.

2. The vehicle according to claim 1, wherein the distance between left rotational axes is same as the distance between right rotation axes.

3. The vehicle according to claim 1, wherein at least one of said left and right frames comprises at least one locking unit, and at least one slidable member arranged to provide sliding movement between at least one of said left and right frames and said base plate for displacement of at least one of said left front wheel and left rear wheel in relation to at least one of said right front wheel and right rear wheel, wherein said at least one locking unit is arranged to fix the position of at least one of said left and right frames in relation to said base plate.

4. The vehicle according to claim 1, wherein said off-set values are set according to a plurality of pre-defined values defined by a vehicle user.

5. The vehicle according to claim 1, wherein said vehicle comprises a transport surface detection unit connected to said frame control unit, and a data memory connected to said frame control unit, wherein said transport surface detection unit is adapted to provide topographical information of the vehicle transport surface, wherein said off-set values are based on said topographical information, and wherein said topographical information comprises dimensional data elements of said transportation surface being stored on said data memory.

6. The vehicle according to claim 5, wherein said surface detection unit comprises a receiver adapted to receive said dimensional data elements over a communication link.

7. The vehicle according to claim 5, wherein said transport surface detection unit comprises a surface sensor and wherein the surface sensor is one or more sensors selected from the group consisting of a photographic sensor, an electromagnetic sensor, an rfid sensor, an acoustic sensor, a distance measurement sensor, and a laser distance measurement sensor.

8. The vehicle according to claim 1, wherein said base plate levelling unit comprises a base linkage pivotably connected to said base plate at a center distance between said left and right frames, whereby said base linkage is rotatable with respect to said base plate around a pivot axis perpendicular to said rotational axis, wherein ends of said base linkage are pivotably connected to said left frame and pivotably connected to said right frame, whereby upon a rotation of said left and right frames around said rotational axis said left frame has a first angular displacement in relation to said right frame and said base plate has a second angular displacement in relation to one of said left and right frames, and wherein said second angular displacement is less than said first angular displacement.

9. The vehicle according to claim 1, further comprising a seat foundation and a second level compensation system arranged for orientation of said seat foundation in space to maintain a level plane of said seat foundation in use of said vehicle.

10. The vehicle according to claim 9, wherein said second level compensation system comprises a pivotable support connecting said seat foundation with said base plate.

11. The vehicle according to claim 10, wherein said second level compensation system comprises a support control unit connected to a level detection unit being adapted to provide levelling information to said support control unit, wherein said second level compensation system further comprises at least one support actuator connected to said support control unit and arranged to displace said pivotable support according to said levelling information.

12. The vehicle according to claim 11, comprising a first and second support actuator pivotably mounted to said base plate at displaced first and second joints and pivotably mounted to said pivotable support at a common third joint.

13. The vehicle according to claim 10, wherein said second level compensation system comprises side struts pivotably connected to said seat foundation and said base plate at either side of said pivotable support, wherein said side struts are connected to said seat foundation by upper strut pivot joints and connected to said base plate by lower strut pivot joints, wherein said pivotable support being connected to said base plate at a lower support pivot joint and to said seat foundation at an upper support pivot joint, and wherein said upper strut pivot joints and said upper support pivot joint are arranged in a displaced configuration at said seat foundation, whereby said side struts are arranged to maintain a plane of said seat foundation upon a displacement of said pivotable support.

14. The vehicle according to claim 9, wherein said seat foundation is connected to a seat actuator, said seat actuator is connected to said level detection unit and arranged to displace the seat foundation in accordance with said levelling information to maintain a level plane of said seat foundation.

15. A method for traversing a stair case comprising: providing the vehicle according to claim 1, said stair case having a plurality of steps for traversing in a first direction at a stair angle, said stair case having an axis of inclination parallel to said first direction and perpendicular to step edges, said vehicle having an apex point adjacent to a seat foundation,
adjusting a wheel off-set of at least one wheel of said vehicle based on step dimensions,
maintaining said apex point along said axis of inclination during said traversing by applying a first level compensation of a first level compensation system comprising alternating rotational movement of said left and right frames.

16. The method according to claim 15, wherein maintaining said apex point along said axis of inclination during said traversing further comprises the step of applying a second level compensation of a second level compensation system comprising displacing a pivotable support joining said left and right frames with said seat foundation.

17. The method according to claim 15, comprising adjusting said wheel off-set continuously as said stair case is traversed.

18. The method according to claim 15, wherein the step of adjusting said wheel off-set further comprises the step of:
adjusting the distance between wheels of said left wheel pair, and/or adjusting the distance between wheels of said right wheel pair.

19. The method according to claim 15, further comprising the step of braking of at least one of said wheels simultaneous as at least one of the remainder of said wheels traverse said stair case.

20. The method according to claim 19, wherein three wheels are braked simultaneously as at least one the remainder of said wheels traverse said stair case.

21. The method according to claim 19, wherein two wheels are braked simultaneous as at least one the remainder of said wheels traverse said stair case.

22. The method according to claim 19, wherein the distance between said at least one braked wheel and said at least one wheel traversing the stair case is adjusted, whereby simultaneous braking and traversing is achieved by respective wheels.

23. The method according to claim 19, further comprising the steps of:
performing alternating action of said wheels between braking; and
traversing in said stair case until the wheels have traversed a desired distance in said stair case.

24. The method according to claim 23, wherein performing said step of alternating action comprises the steps of:
braking of at least one of said wheels at a first position until at least one of the remainder of said wheels has traversed a first distance in said stair case; and
braking the at least one wheel having traversed said first distance at a second position until the at least one wheel at said first position has traversed a second distance in said stair case from said first position.

25. The method according to claim 23, wherein during said alternating action the distance between said at least one braked wheel and said at least one wheel traversing the stair case is adjusted, whereby simultaneous braking and traversing is achieved by respective wheels.

26. The method according to claim 19, wherein said vehicle has a payload at a payload centre of said vehicle, said method comprising shifting the position of said payload centre in relation to said at least one braked wheel.

27. The method according to claims 26, further comprising the step of adjusting the distance between said wheels by wheel actuators and wherein said payload centre is shifted by said wheel actuators.

28. The method according to claim 26, wherein said payload centre is shifted as a function of a change in distance between said at least one braked wheel and said at least one wheel traversing said stair case.

29. The method according to claim 26, comprising traversing a first distance in the staircase with at least one wheel in a first traversing movement, and shifting said payload centre by a fraction of said first distance in a first payload centre movement.

30. The method according to claim 29, wherein said first traversing movement and said first payload centre movement are performed simultaneously, and/or wherein said first traversing movement and said first payload centre movement are substantially in the same direction.

31. The method according to claim 29, comprising adjusting the distance between said wheels by wheel actuators; wherein adjusting the distance between said wheels comprises positioning each wheel at an individual position by an associated actuator of the wheel actuators for each of said wheels; and wherein said first traversing movement is performed by expanding or contracting at least one of said left and right frames, and wherein the distance between said payload centre and each wheel is adjusted by said associated wheel actuator for providing said first payload centre movement.

32. The method according to claim 29, further comprising the steps of:
traversing a second distance in the staircase in a second traversing movement with at least one wheel being braked during said first traversing movement,
shifting said payload centre by a fraction of said second distance in a second payload centre movement, and
repeating said first and second traversing movement until the wheels have traversed a desired distance in said stair case.

33. The method according to claim 29, wherein said fraction is a third of said first distance, or said fraction is a fourth of said first distance.

34. The method according to claim 26, comprising shifting the position of said payload centre with an offset value for adjusting the centre weight point of said vehicle.

35. The method according to claim 15, further comprising the step of adjusting the distance between said wheels by wheel actuators.

36. The method according to claim 35, wherein adjusting the distance between said wheels comprises positioning each wheel at an individual position by an associated actuator of the wheel actuators for each of said wheels.

37. The method according to claim 35, wherein at least one of said left and right frames are expanded or contracted by said wheel actuators, thereby adjusting the distance between wheels of said left wheel pair, and/or adjusting the distance between wheels of said right wheel pair.

38. The method according to claim 15, comprising driving said wheels at different speeds thereby adjusting the distance between wheels of said left wheel pair by allowing expansion or contraction of said left frame, and/or adjusting the distance between wheels of said right wheel pair allowing expansion or contraction of said right frame.

39. A vehicle having a multiple of level compensation systems, said vehicle comprising:
a chassis having a left frame, a right frame and a base plate,
a first level compensation system comprising a pivot joint for pivotably connecting said left and right frames to said base plate, whereby said left and right frames are rotatable with respect to each other around a common rotational axis, wherein said left and right frame extends in a direction perpendicular to said rotational axis,
a left wheel pair comprising a left front wheel and a left rear wheel, the left front wheel and left rear wheels having left rotation axes and being mounted in opposite ends of said left frame, and
a right wheel pair comprising a right front wheel and a right rear wheel, the right front wheel and right rear wheels having right rotation axes and being mounted in opposite ends of said right frame,
wherein at least one first axial distance from a left rotation axis of said left wheel pair to said rotational axis is different from at least one second axial distance from a right rotation axis of said right wheel pair to said rotational axis, such that said left and right wheel pair have at least one off-set to each other, comprising at least one wheel displacement unit arranged to displace at least one of said left front wheel and left rear wheel in relation to at least one of said right front wheel and right rear wheel to provide said off-set,
wherein said first level compensation system comprises a base plate leveling unit arranged to reduce a rotational movement of said base plate relative said left and right frames upon a rotation of said left and right frames around said rotational axis.

40. The vehicle according to claim 39, wherein said base plate leveling unit comprises a base linkage pivotably connected to said base plate at a center distance between said left and right frames, whereby said base linkage is rotatable with respect to said base plate around a pivot axis perpendicular to said rotational axis, wherein ends of said base linkage are pivotably connected to said left frame and pivotably connected to said right frame, whereby upon a rotation of said left and right frames around said rotational axis said left frame has a first angular displacement in relation to said right frame and said base plate has a second angular displacement in relation to one of said left and right frames, and wherein said second angular displacement is less than said first angular displacement.

* * * * *